United States Patent
Ramanathan et al.

(10) Patent No.: US 8,815,466 B2
(45) Date of Patent: Aug. 26, 2014

(54) MICRO-SCALE ENERGY CONVERSION DEVICES AND METHODS

(75) Inventors: Shriram Ramanathan, Acton, MA (US); Alexander C. Johnson, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1096 days.

(21) Appl. No.: 12/146,960

(22) Filed: Jun. 26, 2008

(65) Prior Publication Data

US 2009/0087697 A1     Apr. 2, 2009

Related U.S. Application Data

(60) Provisional application No. 60/954,935, filed on Aug. 9, 2007.

(51) Int. Cl.
| | |
|---|---|
| H01M 8/10 | (2006.01) |
| H01M 8/12 | (2006.01) |
| H01M 4/88 | (2006.01) |
| H01M 8/24 | (2006.01) |

(52) U.S. Cl.
CPC ............ *H01M 8/1266* (2013.01); *H01M 8/126* (2013.01); *Y02E 60/521* (2013.01); *H01M 2300/0077* (2013.01); *H01M 8/1286* (2013.01); *H01M 4/8885* (2013.01); *Y02E 60/525* (2013.01); *H01M 2300/0071* (2013.01); *H01M 2300/0094* (2013.01); *H01M 8/2425* (2013.01); *H01M 8/1253* (2013.01)
USPC .......................................... 429/482; 429/486

(58) Field of Classification Search
USPC ................................................ 429/486, 482
See application file for complete search history.

(56) References Cited

U.S. PATENT DOCUMENTS

| | | | | |
|---|---|---|---|---|
| 2004/0072039 | A1* | 4/2004 | Jankowski et al. | 429/19 |
| 2004/0096572 | A1* | 5/2004 | Chen et al. | 427/115 |
| 2004/0265483 | A1* | 12/2004 | Meyer et al. | 427/115 |
| 2006/0008696 | A1* | 1/2006 | Cha et al. | 429/38 |
| 2006/0134347 | A1* | 6/2006 | Chiruvolu et al. | 427/585 |

FOREIGN PATENT DOCUMENTS

WO    WO2006004957 A    1/2006

OTHER PUBLICATIONS

Baertsch et al., Fabrication and Structural Characterization of Self Supporting Electrolyte Membranes for a micro solid-oxide fuel cell, Materials Research Study, 2004, p. 2604-2615.*

(Continued)

*Primary Examiner* — Ula C Ruddock
*Assistant Examiner* — Frank Chernow
(74) *Attorney, Agent, or Firm* — Elizabeth Kim Patent Law Offices LLC

(57) ABSTRACT

In various aspects, provided are solid oxide fuel cells with an operational temperature of less than about 500° C. that can provide, in various embodiments, a power density of greater than about 0.1 W/cm$^2$ and/or have an ionic conductivity of greater than about 0.00001 ohm$^{-1}$ cm$^{-1}$. In various embodiments, provided are solid oxide fuel cells comprising a solid oxide electrolyte layer that is both an electronic and ionic conductor. In various aspects, provided are methods of making solid oxide fuel cells. In various aspects, provided are solid oxide materials comprising a polycrystalline ceramic layer less than about 100 nm thick having a ionic conductivity of greater than about 0.00001 ohm$^{-1}$ cm$^{-1}$ at a temperature less than about 500° C.

40 Claims, 17 Drawing Sheets

(56) References Cited

OTHER PUBLICATIONS

Karthikeyan Annamalai et al., High temperature conductivity studies on nanoscale yttria-doped zirconia thin films and side effects, Applied Physics Letters, AIP, American Institute of Physics, Melville, NY, vol. 89, No. 18, Nov. 2, 2006, pp. 183116-183116, XP012086766 ISSN: 0003-6951.

* cited by examiner

FIG. 9B  FIG. 9C  FIG. 9D

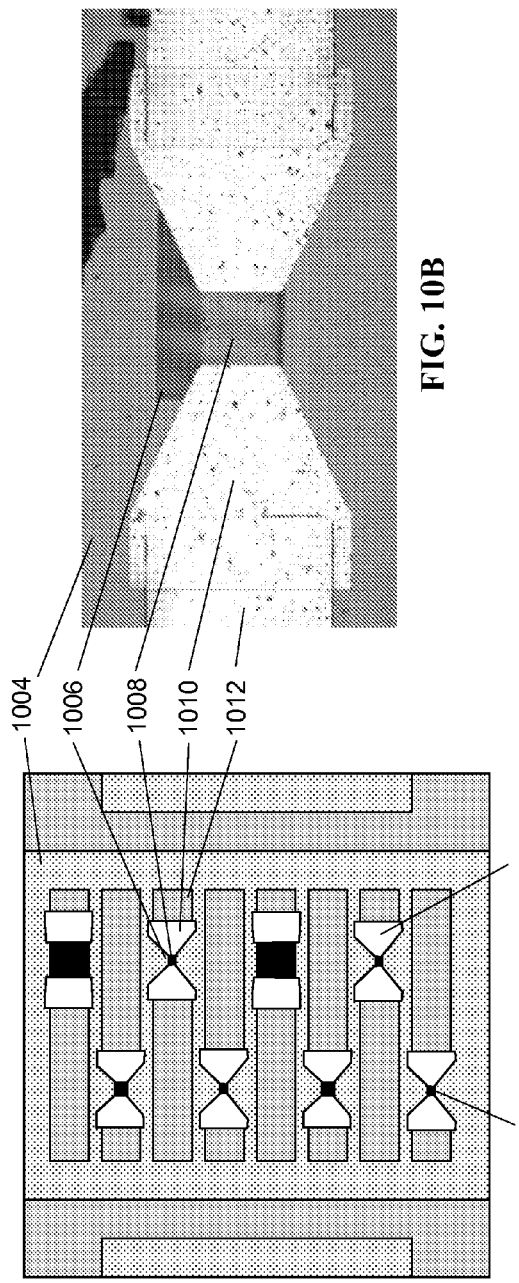
FIG. 10B
FIG. 10A
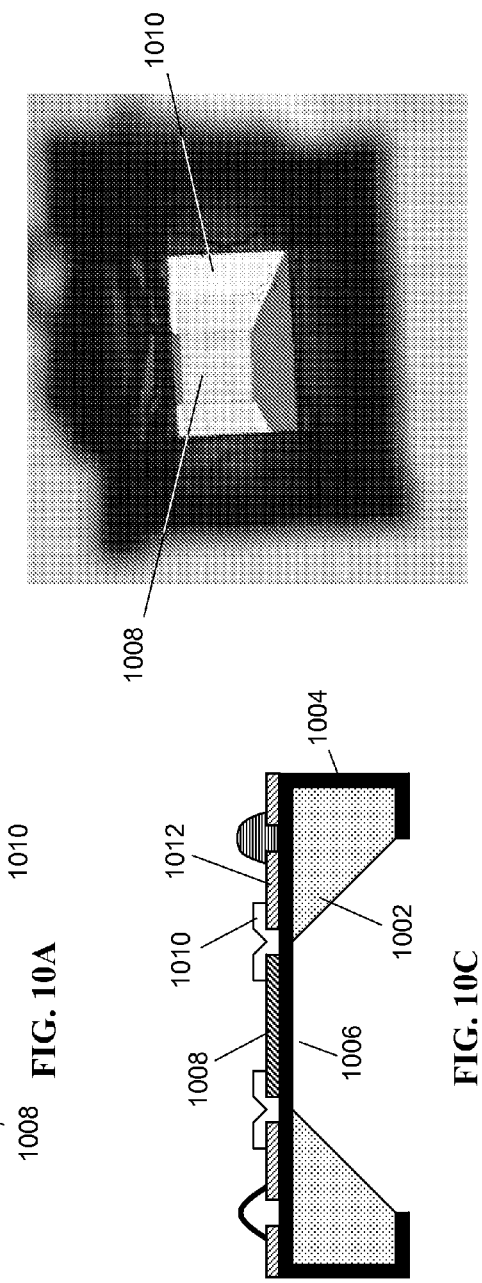
FIG. 10D
FIG. 10C

Top Glass Layer

▨ air input (channel cut into underside of glass)

▨ fuel input (channel cut into underside of glass)

■ top electrode (eventually connects to bottom of stack)

Hear Exchange Layer

● air input through hole

◉ fuel input through hole extra structural support (if necessary)
stack bonds to bottom glass layer here
heat exchangers
connection tab

Bottom Glass Layer

▨ air input through hole
▨ fuel input through hole
▨ air exhaust (channel cut into top side of glass)
▨ fuel exhaust (channel cut into top side of glass)
■ bottom electrode (bonds directly to top of stack)

Side View of Connection Tab electrodes top and bottom,
fuel and air openings on the end

MICRO-SCALE ENERGY CONVERSION DEVICES AND METHODS

This application claims priority to provisional application Ser. No. 60/954,935 filed on Aug. 9, 2007, the contents of which are incorporated herein by reference in its entirety.

BACKGROUND

The economic and environmental benefits of transitioning from an oil-based to a hydrogen-based energy infrastructure are clear, from renewable production to non-polluting consumption to the political benefits of widespread energy independence. One of the major hurdles facing this transition is developing easy-to-use, cost-effective, and efficient conversion devices for turning the chemical energy in hydrogen into electrical or mechanical energy. Electrochemical fuel cells are particularly exciting, due to their intrinsically high efficiency and direct conversion to electrical energy. A breakthrough in fuel cell production could enable a wide range of hydrogen-fueled applications.

Unfortunately, traditional solid oxide fuel cells (SOFCs) must run at very high temperatures, 800-1100° C., to be effective. At such high temperatures, the choice of materials for the electrodes and structural components of the cell (membrane support, gas handling, sealants) is severely constrained, particularly in the reactive oxygen- and hydrogen-rich environments of a fuel cell. Even the most stable of materials will corrode under these conditions and/or fatigue and fail under the stress of thermal cycling. However, despite the long-felt need for lower operating temperature SOFCs, to our knowledge no success has been achieved in this regard prior to the present inventions described herein.

SUMMARY OF THE INVENTION

The present inventions provide various embodiments of solid oxide fuel cells, solid oxide fuel cell structures, and methods of making same. The solid oxide fuel cells of the present inventions comprise a porous anode, a porous cathode, and a solid oxide electrolyte disposed between then anode and cathode.

In various aspects, the present inventions provide solid oxide fuel cell structures and methods of fabrication that are capable of producing a solid oxide based fuel cell with an operational temperature of less than about 500° C. In various embodiments, provided are solid oxide fuel cells and methods for making the same that are capable of operation at temperatures less than about one or more of (a) 450° C.; (b) 400° C.; (c) 350° C.; (d) 300° C.; and (e) 250° C.

In various embodiments, the present inventions provide solid oxide fuel cell structures and methods of making same, where the fuel cell is capable of providing at a temperature of less than about 500° C. a power density of greater than about 0.1 W/cm$^2$ and preferably greater than about 0.6 W/cm$^2$.

In various embodiments, the present inventions provide solid oxide fuel cell structures and methods of making same, where the solid oxide fuel cell comprises a solid oxide electrolyte layer less than about 100 nm thick disposed between a porous anode layer and a porous cathode layer, where the solid oxide electrolyte layer has an ionic conductivity of greater than about 0.00001 ohm$^{-1}$ cm$^{-1}$ at a temperature of less than about 500° C.

A variety of solid oxides can be used for the solid oxide electrolyte layer of the fuel cells of the present inventions including, but not limited to, a polycrystalline ceramic comprising one or more of stabilized zirconia, partially stabilized zirconia, stabilized hafnia, partially stabilized hafnia, mixtures of zirconia and hafnia, ceria with zirconia, bismuth with zirconia, gadolinium, germanium, doped partially stabilized zirconia, doped stabilized zirconia, and mixtures thereof. Examples of dopants include, but are not limited to, one or more of the oxides of Y, Ce, Ca, Mg, Sc, Nd, Sm, Eu, Gd, Th, Dy, Ho, Er, Tm, Yb, Lu, In, Ti, Sn, Nb, Ta, Mo, and W and mixtures thereof. For example, in various embodiments, the solid oxide electrolyte comprises a polycrystalline ceramic comprising one or more of yttria-doped bismuth oxide (YDB), gadolinia-doped ceria (GDC), and yttria-stabilized zirconia (YSZ).

In various embodiments, the solid oxide electrolyte layer comprises two or more layers of differing solid oxide materials. In various embodiments, the solid oxide layer comprises a first inner solid oxide electrolyte layer disposed between a first outer solid oxide electrolyte layer and a second outer solid oxide electrolyte layer, where the material of the first inner solid oxide electrolyte layer is different from that of at least one of the first and second outer solid oxide electrolyte layers. In various embodiments, the first inner solid oxide electrolyte layer is both an ionic and electronic conductor, and the first and second outer solid oxide electrolyte layers are substantially only ionic conductors and have a thickness of less than about 5 nm.

A variety of materials can be used for an anode of a fuel cell of the present inventions including, but not limited to, Ni, zirconia, Y-doped zirconia, Cu, ceria, Gd-doped ceria, aliovalently doped oxide ceramics, and combinations thereof.

A variety of materials can be used for a cathode of a fuel cell of the present inventions including, but not limited to, Pt, Au, Ta, Ru, Ir, Cu, La, Sr, Fe, LaMnO$_3$, SrMnO$_3$, (La$_{1-x}$Sr$_x$MnO$_3$), La$_{1-x}$Sr$_x$Co$_{1-y}$Fe$_y$O$_3$, and combinations thereof.

In various aspects, the present inventions provide methods for fabrication of solid oxide fuel cells. In various embodiments, these methods facilitate the fabrication of a solid oxide fuel cell with an operational temperature of less than about 500° C. It is one realization of the present inventors that certain surface properties of the solid oxide electrolyte layer can render it incapable of low temperature operation. The methods of the present inventions teach various embodiments of how these property limitations can be overcome and/or removed to provide for a solid oxide fuel cell with an operational temperature of less than about 500° C.

In various embodiments, the methods comprise the steps of fabricating a solid oxide fuel cell core comprising the steps of: (a) providing a substrate; (b) depositing under vacuum conditions of less than about 5×10$^{-7}$ torr a first porous electrode layer on at least a portion of the substrate such that the root-mean-square roughness of at least a portion of the surface upon which a solid oxide electrolyte layer is to be deposited is less than about 3 nm; (c) depositing under vacuum conditions of less than about 5×10$^{-7}$ torr a solid oxide electrolyte layer less than about 100 nm thick on at least a portion of the first electrode layer; and (d) depositing a second porous electrode layer on at least a portion of the solid oxide electrolyte layer. Preferably, the step of depositing the second porous electrode layer also comprises depositing the second porous electrode layer under vacuum conditions of less than about 5×10$^{-7}$ torr.

Preferably, the step of depositing the solid oxide electrolyte layer comprises depositing a layer less than about 50 nm thick; and more preferably less than about 25 nm thick.

It is a realization of the inventors that surface roughness of the solid oxide electrolyte layer can have a detrimental effect on the operational temperature. In preferred embodiments, the step of depositing the solid oxide electrolyte layer comprises depositing the layer such that the root-mean-square roughness of at least a portion of the layer upon which a second porous electrode layer is to be deposited is less than about 3 nm; and more preferably a root-mean-square roughness that is less than about 1 nm.

In various aspects, provided are solid oxide electrolyte materials comprising a polycrystalline ceramic layer less than about 100 nm thick having an ionic conductivity of: greater than about 0.00001 ohm$^{-1}$ cm$^{-1}$ at a temperature of less than about 500° C.; and/or greater than about 0.0001 ohm$^{-1}$ cm$^{-1}$ at a temperature of less than about 500° C. In various embodiments, the polycrystalline ceramic layer has at least one surface with a root-mean-square roughness of less than about 3 nm, preferably less than about 2 nm, and more preferably less than 1 nm. In various embodiments, the solid oxide electrolyte materials are fabricated as part of a neutral and/or charged molecule sensor, such as, e.g., an oxygen sensor, hydrogen sensor, carbon monoxide sensor, phosgene sensor, etc.

A variety of polycrystalline ceramics can be used in the solid oxide electrolyte materials including, but not limited to, one or more stabilized zirconia, partially stabilized zirconia, stabilized hafnia, partially stabilized hafnia, mixtures of zirconia and hafnia, ceria with zirconia, bismuth with zirconia, gadolinium, germanium, doped partially stabilized zirconia, doped stabilized zirconia, and mixtures thereof. Examples of dopants include, but are not limited to, one or more of the oxides of Y, Ce, Ca, Mg, Sc, Nd, Sm, Eu, Gd, Th, Dy, Ho, Er, Tm, Yb, Lu, In, Ti, Sn, Nb, Ta, Mo, and W and mixtures thereof. For example, in various embodiments, the solid oxide electrolyte comprises a polycrystalline ceramic comprising one or more of yttria-doped bismuth oxide (YDB), gadolinia-doped ceria (GDC), and yttria-stabilized zirconia (YSZ).

In various embodiments, the polycrystalline ceramic layer comprises two or more layers of differing solid oxide materials. In various embodiments, the polycrystalline ceramic layer comprises a first inner solid oxide electrolyte layer disposed between a first outer solid oxide electrolyte layer and a second outer solid oxide electrolyte layer, where the material of the first inner solid oxide electrolyte layer is different from that of at least one of the first and second outer solid oxide electrolyte layers. In various embodiments, the first inner solid oxide electrolyte layer is both an ionic and electronic conductor, and the first and second outer solid oxide electrolyte layers are substantially only ionic conductors and have a thickness of less than about 5 nm.

In various aspects, provided are methods of providing electrical current using a solid oxide fuel cell, comprising the steps of (a) providing a solid oxide fuel cell comprising a porous anode layer, a porous cathode layer, and a solid oxide electrolyte layer less than about 100 nm thick disposed between the anode and cathode layers; (b) contacting one of the anode and cathode layers with a fuel and contacting the other of the anode and cathode layers with an oxidizer; and (c) operating said solid oxide fuel cell such that the temperature of the solid oxide electrolyte is less than about 500° C. In various embodiments, these methods comprise providing a solid oxide electrolyte layer less than about 50 nm thick, less than about 25 nm thick, less than about 10 nm thick, less than about 5 nm thick, and/or less than about 1 nm thick. In various embodiments, these methods comprise operating said solid oxide fuel cell such that the temperature of the solid oxide electrolyte is less than about one or more of (a) 450° C.; (b) 400° C.; (c) 350° C.; (d) 300° C.; and (e) 250° C. In various embodiments, these methods comprise providing power at a power density of greater than 0.1 W/cm$^2$, greater than about 0.6 W/cm, greater than about 0.8 W/cm$^2$, greater than about 1 W/cm$^2$, greater than about 5 W/cm$^2$, and/or greater than about 10 W/cm$^2$.

In yet another aspect, the invention is a structure for encapsulating a fuel cell for thermal shielding including an outer wall surrounding the fuel cell creating a cavity between the fuel cell and outer wall and an interconnect support structure bonded to an inside surface of the outer wall and adapted to support the fuel cell and to carry gas and electrical connections to the outside of the outer wall. The cavity may be evacuated or filled with an insulator such as silica aerogel.

BRIEF DESCRIPTION OF THE DRAWINGS

The foregoing and other aspects, embodiments, objects, features and advantages of the present inventions can be more fully understood from the following description in conjunction with the accompanying drawings. In the drawings, like reference characters generally refer to like features and structural elements throughout the various Figures. The drawings are not necessarily to scale, emphasis instead being placed upon illustrating the principles of the present inventions, wherein.

(FIG. 2D) showing the formation of grains within the solid oxide. The scale varies between figures as indicated by the inset scale bar.

FIGS. 10A-10E are schematical depictions and photographs of a solid oxide fuel cell according to various embodiments of the present inventions; FIGS. 10A and 10C providing, respectively a "top" and sectional schematic depiction, and FIGS. 10B and 10D providing, respectively a photograph from the "top" and "bottom" of the solid oxide fuel cell structure, FIG. 10E is a photograph of a solid oxide fuel cell structure with various sized YSZ membranes fabricated by lithography in a chip format.

DETAILED DESCRIPTION OF VARIOUS EMBODIMENTS

In various embodiments, the present inventions provide solid oxide fuel cells comprising a porous anode, a porous cathode, and a solid oxide electrolyte disposed between the anode and cathode where the cell has an operational temperature of less than about one or more of: (a) 500° C.; (b) 450° C.; (c) 400° C.; (d) 350° C.; (e) 300° C.; and/or (f) 250° C. In various embodiments, provided are cells that at the operational temperature can provide one or more of: (a) a power density of greater than about 0.6 W per $cm^2$ of solid oxide electrolyte exposed to the fuel; (b) a power density of greater than about 0.8 W per $cm^2$ of solid oxide electrolyte exposed to the fuel; (c) a power density of greater than about 1 W per $cm^2$ of solid oxide electrolyte exposed to the fuel; (d) a power density of greater than about 5 W per $cm^2$ of solid oxide electrolyte exposed to the fuel; (e) a power density of greater than about 10 W per $cm^2$ of solid oxide electrolyte exposed to the fuel; (d) a solid oxide electrolyte layer having an ionic conductivity of greater than about 0.00001 $ohm^{-1}$ $cm^{-1}$; (e) a solid oxide electrolyte layer having an ionic conductivity of greater than about 0.00005 $ohm^{-1}$ $cm^{-1}$; and/or (f) a solid oxide electrolyte has an ionic conductivity of greater than about 0.0001 $ohm^{-1}$ $cm^{-1}$.

In various embodiments, the solid electrolyte layer is less than about one or more of: (a) 100 nm thick; (b) 75 nm thick; (c) 50 nm thick; (d) 25 nm thick; (e) 10 nm thick; (f) 5 nm thick; and/or (g) 1 nm thick. Preferably, the solid oxide electrolyte layer was formed with a root-mean-square surface roughness of less than about 3 nm, of less than about 2 nm, and/or more preferably of less than about 1 nm.

Figure 1:
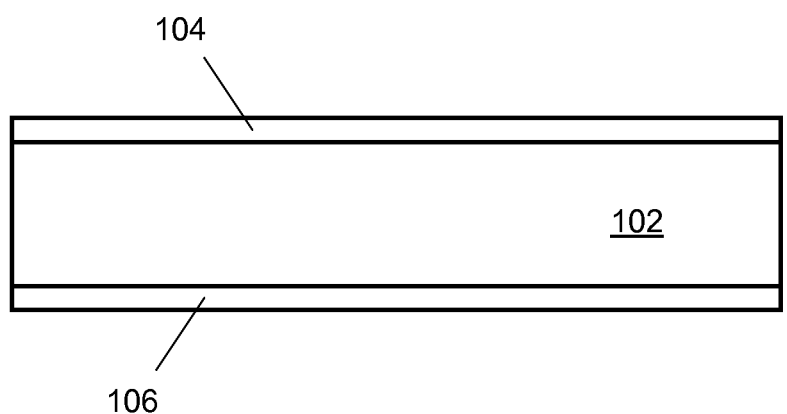
FIG. 1 is a schematic illustration of a multi-component solid oxide electrolyte according to various embodiments.

In various embodiments, the solid oxide electrolyte layer comprises two or more layers of differing solid oxide materials. For example, referring to FIG. 1, in various embodiments, the solid oxide layer comprises a first inner solid oxide electrolyte layer 102 disposed between a first outer solid oxide electrolyte layer 104 and a second outer solid oxide electrolyte layer 106.

In various embodiments, the first and second outer layers are less than about 5 nm thick, preferably less than about 2 nm thick, and are solid oxides that are substantially only ionic conductors; and the inner layer comprises a solid oxide that is not necessarily a pure ionic conductor. For example, in various embodiments the first inner solid oxide electrolyte layer is both an ionic and electronic conductor. In various embodiments, the inner solid oxide electrolyte layer is a fast ionic conductor. In various embodiments, the first and second outer layers each have a thickness in the range between about 0.5 nm and about 5 nm.

In various embodiments, it is believed, without being held to theory that the nanoscale outer electrolyte layers comprising only ionic conductor materials can block electron flow and, for example, facilitate maintaining high ion conductivity even where the inner electrolyte layers comprises a solid oxide with electron conducting character.

In various embodiments of a multi-layer solid oxide electrolyte layer, the first inner solid oxide electrolyte layer comprises gadolinia-doped ceria (GDC), and the first and second outer layers consist essentially of a one or more solid oxide materials that are substantially only ionic conductors. In various embodiments, the one or more solid oxide materials that are substantially only ionic conductors comprise yttria-stabilized zirconia (YSZ).

A variety of solid oxides can be used for a solid oxide electrolyte layer, including in a layer of a multi-layer solid oxide electrolyte layer, of a fuel cell of the present inventions including, but not limited to, a polycrystalline ceramic comprising one or more stabilized zirconia, partially stabilized zirconia, stabilized hafnia, partially stabilized hafnia, mixtures of zirconia and hafnia, ceria with zirconia, bismuth with zirconia, gadolinium, germanium, doped partially stabilized zirconia, doped stabilized zirconia, and mixtures thereof. Examples of dopants include, but are not limited to, one or more of the oxides of Y, Ce, Ca, Mg, Sc, Nd, Sm, Eu, Gd, Th, Dy, Ho, Er, Tm, Yb, Lu, In, Ti, Sn, Nb, Ta, Mo, and W and mixtures thereof. For example, in various embodiments, the solid oxide electrolyte comprises a polycrystalline ceramic comprising one or more of yttria-doped bismuth oxide (YDB), gadolinia-doped ceria (GDC), and yttria-stabilized zirconia (YSZ).

Figures 2A, 2B, 2C, 2D:
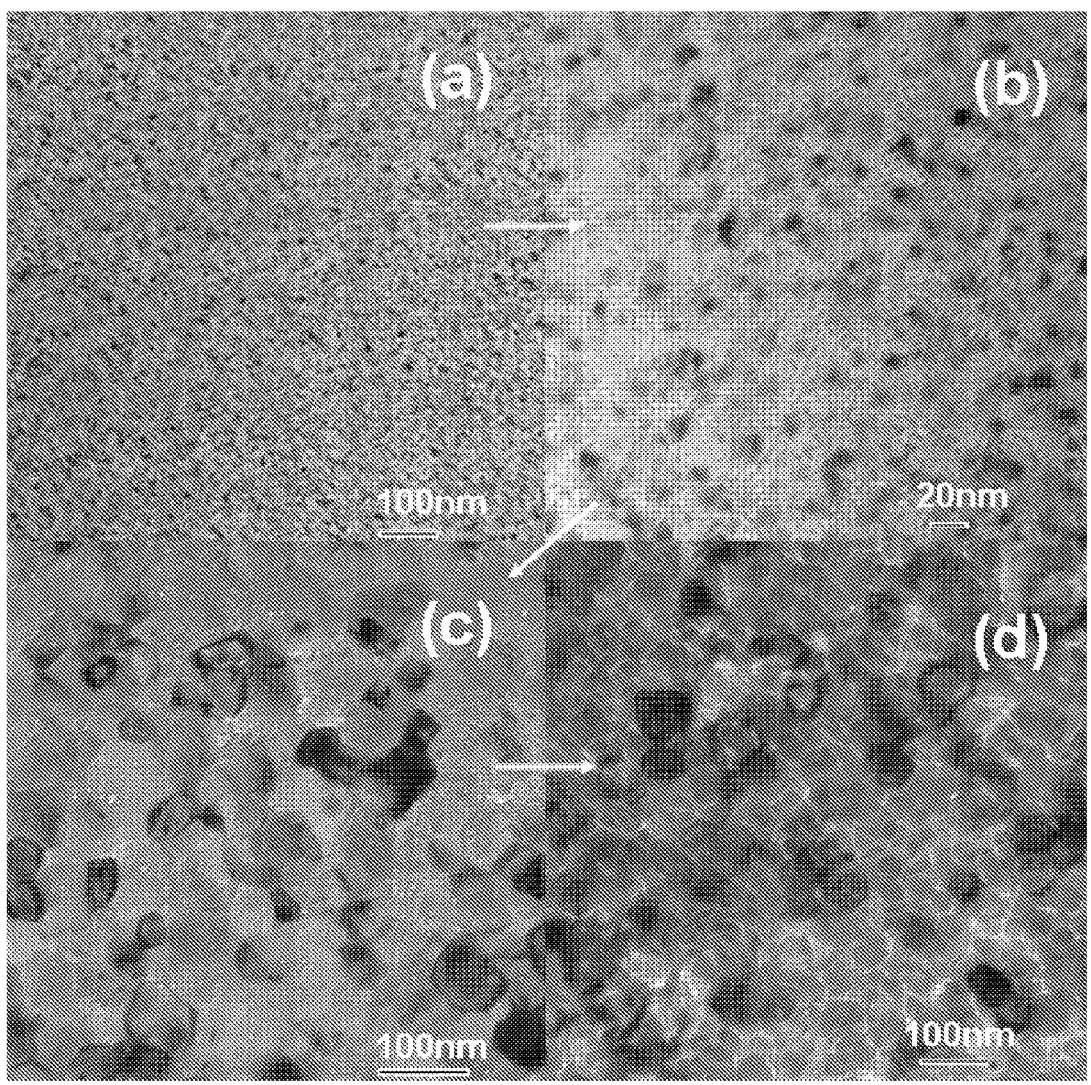
FIGS. 2A-D are transmission electron microscope (TEM) images of a solid electrolyte film illustrating the heating of a film from room temperature (FIG. 2A) to about 600° C.
Figure 3:
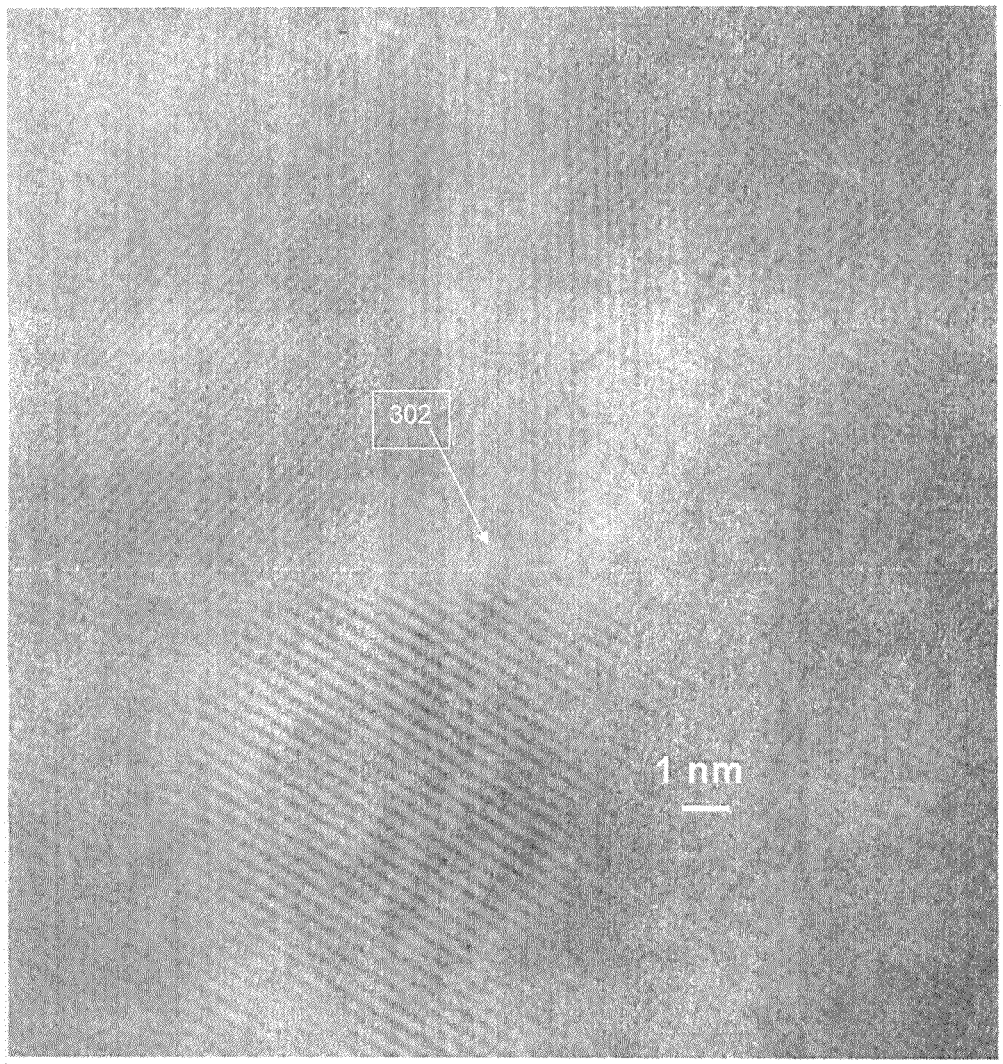
FIG. 3 is an high resolution TEM image showing the absence of an amorphous phase between grain boundaries. Scale is indicated by the inset scale bar.

In various aspects, it is believed, without being held to theory, that the provision of various embodiments of solid oxide fuel cells of the present inventions is facilitated by the formation of solid oxide electrolyte layers with substantially no amorphous phase between grain boundaries in the solid oxide electrolyte. For example, referring to FIGS. 2A-D, an approximately nm thick YSZ layer is shown at room temperature (FIG. 2A) and upon heating to 600° C. (FIG. 2D). The formation of grains and attendant grain boundaries can be seen in these TEM images. FIG. 3 is a high resolution TEM image of a grain boundary of a YSZ solid oxide electrolyte layer, approximately 32 nm thick, produced according to various embodiments of the present inventions. The TEM image of FIG. 3 shows a grain boundary 302 with substantially no amorphous phase present. FIGS. 2A-D illustrate grain growth and crystallization of the films, but it is to be understood that in various embodiments, the electrolyte layers can be annealed and/or sintered.

In various embodiments it is believed, without being held to theory, that the formation of a nanoscale film with substantially no amorphous phase between grain boundaries can be facilitated and/or provided by formation of the electrolyte layers with and/or on surfaces that have a surface root-mean-square roughness of less than about 3 nm, preferably less than about 2 nm, and more preferably less than about 1 nm.

A variety of materials can be used for a porous anode layer of a fuel cell of the present inventions including, but not limited to, Ni, zirconia, Y-doped zirconia, Cu, ceria, Gd-doped ceria, alio-valently doped oxide ceramics, and combinations thereof. It is to be understood that with respect to an anode layer the term porous refers to the anode layer being porous with respect to the fuel gas and that the anode can be non-porous with respect to other gases.

A variety of materials can be used for a porous cathode layer of a fuel cell of the present inventions including, but not limited to, Pt, Au, Ta, Ru, Ir, Cu, La, Sr, Fe, $LaMnO_3$, $SrMnO_3$, ($La_{1-x}Sr_xMnO_3$), $La_{1-x}$ $Sr_x$ $Co_{1-y}$ $Fe_y$ $O_3$, and combinations thereof. It is to be understood that with respect to a cathode layer the term porous refers to the cathode layer being porous with respect to the oxidizer and that the cathode can be non-porous with respect to other gases. In various embodiments, the porous cathode layer material has a perovskite structure.

In various embodiments, the solid oxide fuel cells of the present inventions comprise one or more interconnection layers to improve, e.g., the electrical contact between an electrolyte layer and an electrode layer. For example, in various embodiments, an interconnection layer comprises one or more of $LaCrO_3$ doped with a rare earth element (Ca, Mg, Sr, etc.); Ca-doped yttrium chromite; and metals, such as, e.g., Fe, Cr, Cu, Ag, Au, Pt, and the like.

Although the present inventions, provide in various aspects and embodiments, solid oxide fuel cells with operating temperatures less than those found with traditional cells, the environments within such cells can have detrimental effects given, e.g., the temperature and strong oxidizing environments found in various regions of the cells. In various embodiments, one or more protective coatings can be used to facilitate protecting substrates, manifold channels, housings, etc. For example, in various embodiments a thin film of silicon nitride or similar insulating material can be used to reduce and/or prevent oxidation to, e.g., increase the operation life of a device.

In various embodiments, the solid oxide fuel cells can be used with a variety of fuel oxidizer combinations including, but not limited to, hydrogen/oxygen; syngas (a mixture of hydrogen and carbon monoxide); and fuels such as gaseous alkanes, such as, e.g., methane, butane, propane, and the like, with an oxidizer, e.g., oxygen, carbon monoxide, and the like.

Methods of Fabrication and Structure Examples

In various aspects, the present inventions provide methods for the formation of solid oxide fuel cells. FIGS. 4A-10E illustrate various non-limiting structures and methods for fabrication. For example, referring to FIGS. 4A-B, in various embodiments a solid oxide fuel cell comprises a solid oxide electrolyte layer 402 disposed between a first porous electrode layer 404 (e.g., a cathode in FIGS. 4A-B) and a second porous electrode layer 406 (e.g., an anode in FIGS. 4A-B). The cathode-electrolyte-anode structure is formed on a substrate 408, 410 (e.g., silicon oxide 408 on silicon 410). The substrate has a first manifold 412 for the delivery of a fuel (e.g., hydrogen) to the anode side of a fuel cell core and a second manifold 414 for the delivery of an oxidizer (e.g., oxygen) to the cathode side of a fuel cell core. In various embodiments, one or more of the manifolds comprise a conductive material, e.g., a metal. For example, in various embodiments, the layer 416 forming the second manifold comprises a metal. In various embodiments, such a conductive manifold can be used as part of the electrical leads and contacts (e.g., cathode contact 418) of the structure providing useable current from the device. The contacts 418, 420 of the fuel cell structure can comprise one or more interconnection layers to improve, e.g., conductivity.

Figure 4A:
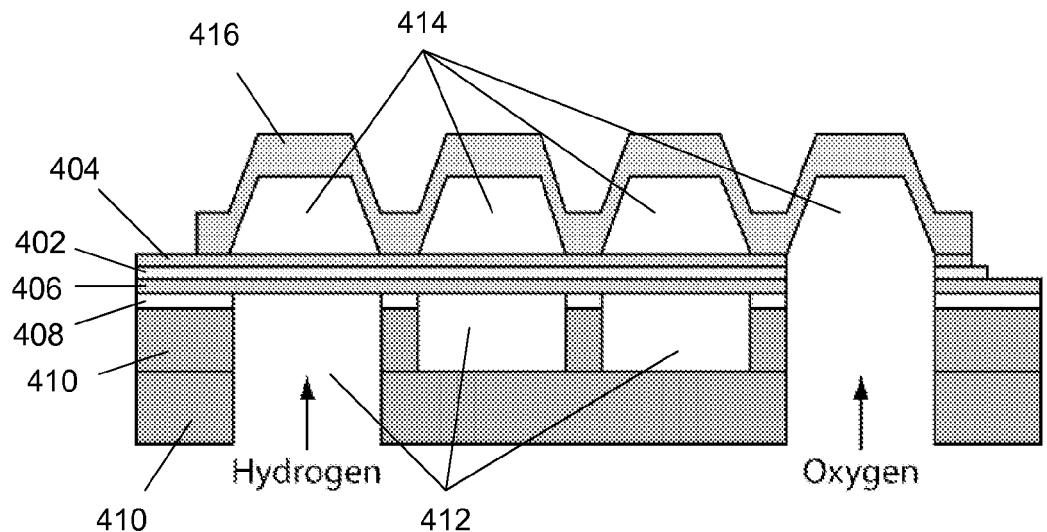
FIGS. 4A-4B schematically depict a solid oxide fuel cell structure according to various embodiments of the present inventions.
Figure 4B:
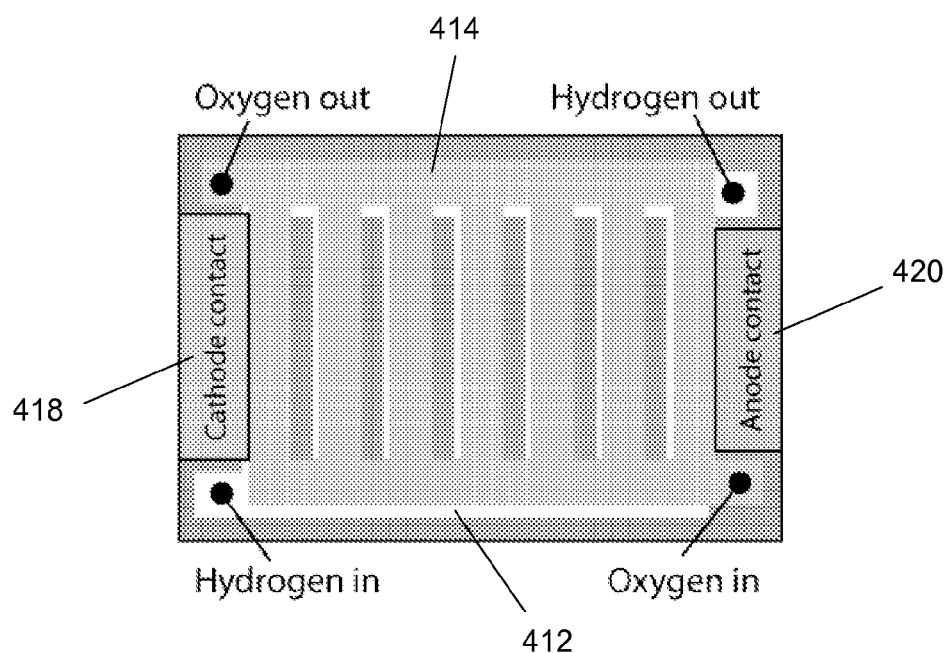

FIGS. 4A and 4B also illustrate provision of a branched fuel and oxidizer manifolds 412, 414 the illustration in FIG. 4B offsets the second manifold 414 and first manifolds 412 to illustrate their general relation and schematic examples of arrangements of fuel and oxidizer inputs and output.

As illustrated in FIGS. 4A-B, the anode layer can be deposited on the substrate, however, it is to be understood that the order of deposition can be reversed with the cathode layer deposited on the substrate. It is further to be understood that in various embodiments, the fuel cell core structure of anode-solid oxide electrolyte-cathode are arranged in a three-dimensional stack, with various substrate material layers forming a cap and/or manifold for one layer of fuel cells cores and the substrate for another layer of fuel cell cores. It is also to be understood that the designation of anode/hydrogen channel vs. cathode/oxygen channel can be varied, and design considerations can be used to determine which space serves which purpose. For example, in various embodiments lithography fabrication can be simpler if the branched air space under the "top" manifold 414 is significantly thinner than the air space below 412 (which is about the thickness of the substrate, here illustrated as a silicon wafer). In various embodiments, excess air may be desired and supplied to the cell to cool it, and a larger space used for this purpose. The fuel cell structures of the present inventions can be fabricated in a variety of techniques. Various of these techniques and methods are discussed in the context of FIGS. 5A-5E.

Referring to FIGS. 5A-5E, in various embodiments a fuel cell can be formed by formation of a patterned porous anode layer 406 on a substrate 408, 410, formation of a patterned solid oxide electrolyte layer 402 on the anode layer, and formation of a patterned porous cathode layer 404 on the electrolyte layer. Between layer formation, after all layers are formed, or a combination thereof, an etching process can be used to form channels 502 that can be used to form a fuel or oxidizer manifold. In various embodiments, a series of channels for a manifold can be formed by depositing a resist 504 and on the resist depositing another layer 506, e.g., a metal layer. Additional resists can be deposited on the back side of the substrate 508 and the material etched in one or more steps to provide a manifold 510 for the delivery of an oxidizer to the cathode layer side of the fuel cell core and a second series of channels 512 that can be used to form a manifold for delivery of a fuel to the anode layer side. In various embodiments, referring to FIG. 5E, a manifold for the delivery of a fuel to the anode side of the fuel cell core is provided by bonding another layer 514 (e.g., a silicon wafer), which has holes for gas entry and exhaust, to the back side 508 of the substrate 410.

Figure 5A:
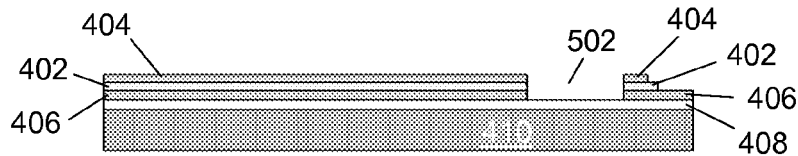
FIGS. 5A-5E schematically depict methods for fabrication of a solid fuel cell structure according to various embodiments of the present inventions.
Figure 5B:
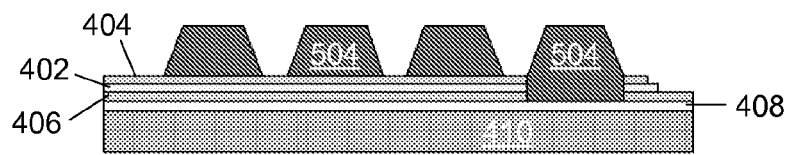
Figure 5C:
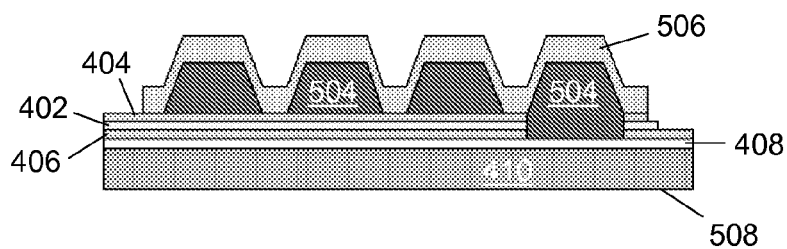
Figure 5D:
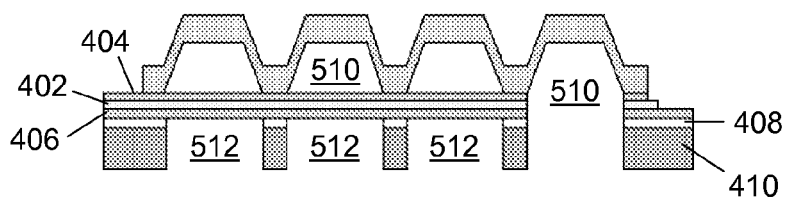
Figure 5E:
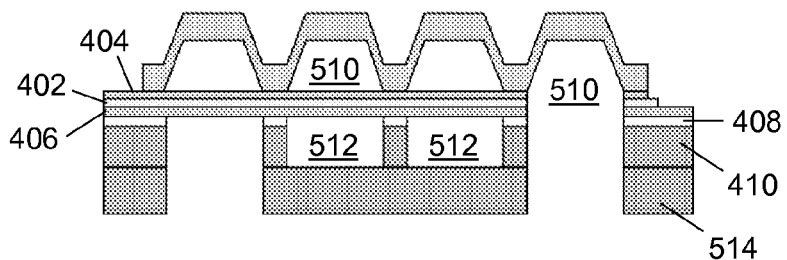
Figure 6:
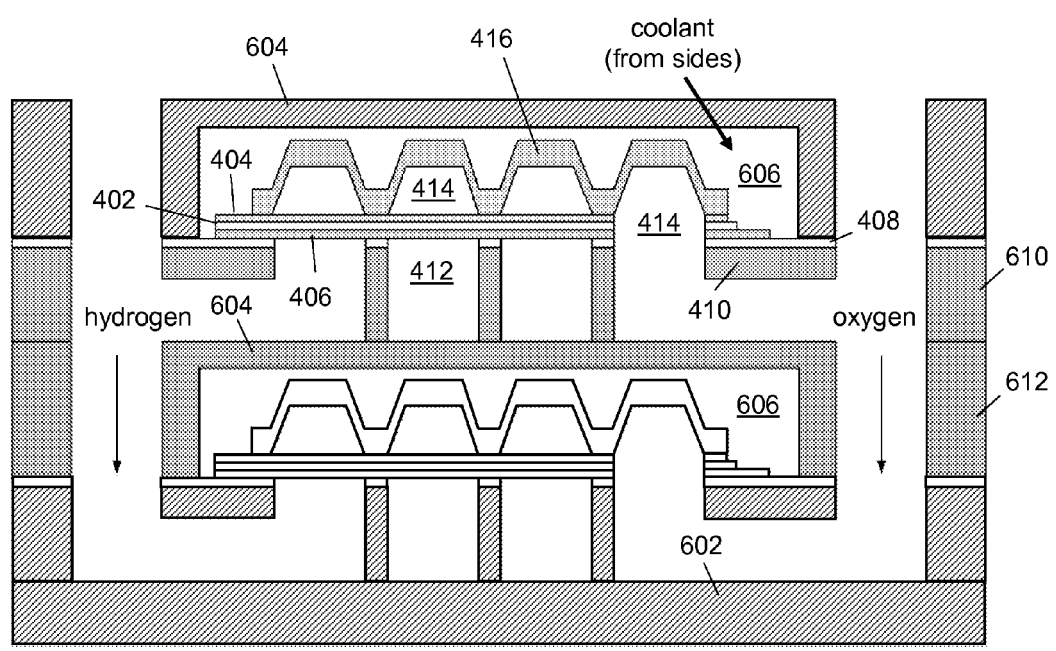
FIG. 6 schematically depicts a solid oxide fuel cell stack structure according to various embodiments of the present inventions.

In various embodiments, a manifold structure can be integrated into a stack of fuel cells. For example, referring to FIG. 6, in various embodiments an integrated three-dimensional fuel cell structure can be formed by placing a core of multiple fuel cells, e.g., as illustrated in FIG. 5E, against a base substrate structure 602. A cap structure 604 can be placed over the fuel cell core and serve as the base for subsequent cores, thus in various embodiments providing, for example, a series of stacked fuel cells with manifolding integrated into the stack. In various embodiments, the space 606 a cap structure 604 can be used to provide a coolant.

Fuel and oxidizer gas can be provided to a fuel cell stack in several ways. In various embodiments, the gas exhausts are brought out the bottom of the stack such that the flow impedance is substantially the same through each cell. In various embodiments, this effect can be generated while preserving the simplicity of the gas lines entering on the same side of the stack by, for example, etching a trench in the bottom substrate and bringing the exhausts back up through a different hole in the stack.

It is to be understood that the cathode/electrolyte/anode trilayer can be formed in a variety of ways. For example, in various embodiments two of the three layers are formed on one side of the substrate (e.g., a silicon wafer) where the solid oxide electrolyte layer is formed on the substrate and one of the electrode layers formed on the electrolyte layer. The back side of the substrate (the side without the electrolyte layer) can be etched to expose the electrolyte layer and the other electrode layer formed on the electrolyte layer. For example, in various embodiments this process supports the electrolyte on the substrate surface rather than a porous electrode layer which can be rougher (greater root-mean-square surface roughness) than the substrate surface. In various embodiments, this facilitates making the electrolyte layer thinner, and can, e.g., facilitate electrically connecting the cells in series, as the bottom electrode can be formed to contact the substrate which can be chosen, in various embodiments, to be conducting (e.g., such as a doped silicon wafer).

For example, referring to FIGS. 7A-D, in various embodiments, a patterned solid oxide electrolyte layer 702 is formed on a substrate 704, 706 (e.g., silicon oxide 704 on silicon 706) and a first patterned porous electrode layer 708 formed on the electrolyte layer 702. Fabrication can proceed with etching the backside of the substrate to form channels 710 and expose the back side of the electrolyte layer and a second porous electrode layer 712 formed on the electrolyte layer. A cap structure 714 having channels can be used to form a manifold for delivery of a gas to the first porous electrode layer 708. In various embodiments, channels are formed in the cap to provide a space 716 that can be used, e.g., to deliver a cooling gas.

Figure 8:
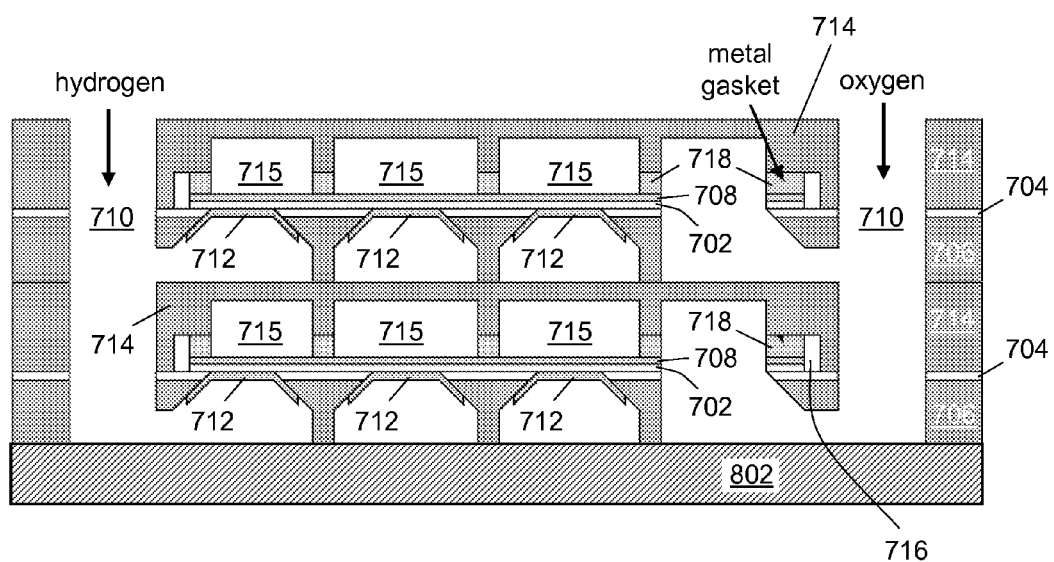
FIG. 8 schematically depicts a solid oxide fuel cell stack structure according to various embodiments of the present invention.

In various embodiments a metal layer 718 can be formed and, e.g., used to make contact between the upper electrode layer and a cap 714 above that may in turn serve as a base substrate for another series of fuel cell cores (see, e.g., FIG. 8). In various preferred embodiments, the metal layer 718 is formed with a sufficiently precise thickness and/or of a metal that is sufficiently malleable such that it makes good electrical contact between the porous electrode layer and the cap without.

In various embodiments, the porous electrode layer is sufficiently malleable and/or the first porous electrode layer 708 thickness and the depth of the corresponding etch in an adjoining cap 714 are formed with a sufficient precision to provide direct contact between the first porous electrode layer (e.g., an anode) and the cap (e.g., an adjoining silicon wafer).

Figure 7A:
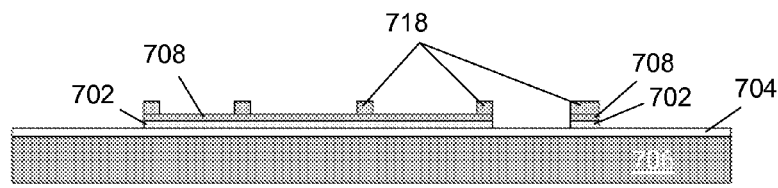
FIGS. 7A-7D schematically depict methods for fabrication of a solid fuel cell structure according to various embodiments of the present inventions.
Figure 7B:
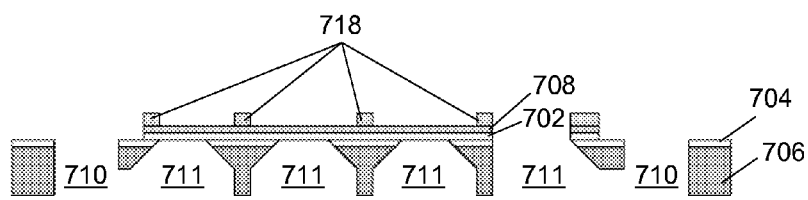
Figure 7C:
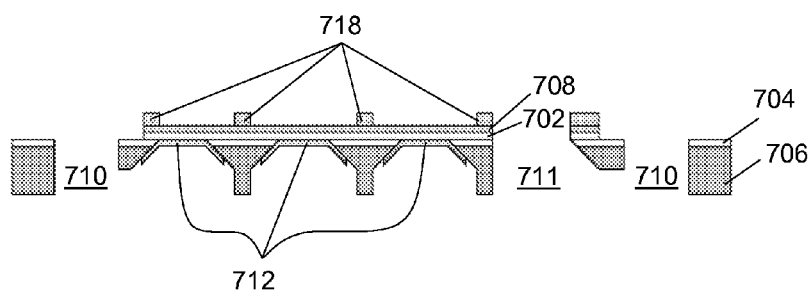
Figure 7D:
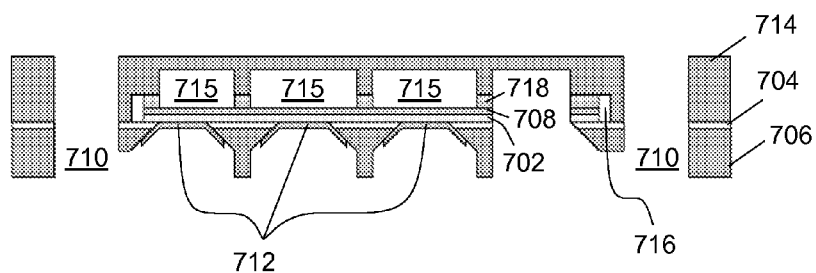

FIG. 8 depicts one of many possible embodiments of integrating the fuel cell cores illustrated in FIGS. 7A-D into a stack of fuel cells. For example, referring to FIG. 6, in various embodiments an integrated three-dimensional fuel cell structure can be formed by placing a core of multiple fuel cells, e.g., as illustrated in FIG. 7D, against a base substrate structure 802 forming, e.g., a manifold for delivery of a gas to the second porous electrode layer (here a fuel, hydrogen, is illustrated and the second electrode layer is considered to be an anode and the first electrode layer a cathode). The cap structure 714 serves as the base for subsequent cores, thus in various embodiments providing, for example, a series of stacked fuel cells with manifolding integrated into the stack.

Figure 9A:
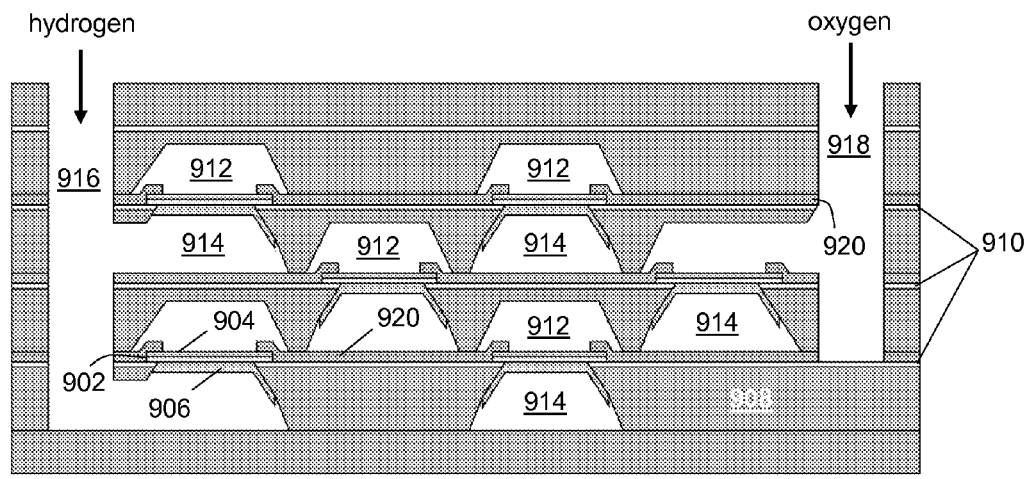
FIGS. 9A-9D schematically depict an interleaved solid oxide fuel cell stack structure according to various embodiments of the present inventions and FIGS. 9E-9H schematically depict aspects of methods for fabrication of the same according to various embodiments of the present inventions.
Figure 9E:
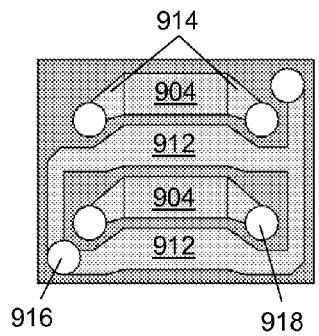
Figure 9E:
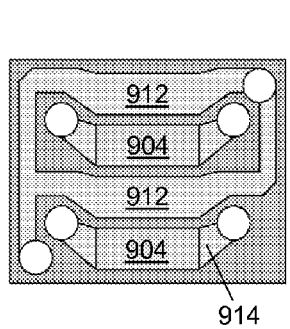
Figure 9E:
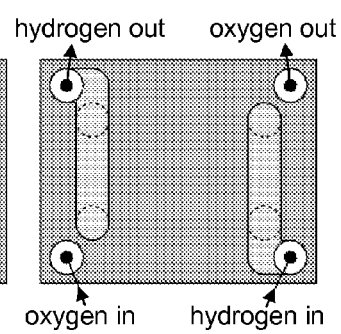
Figure 9E:
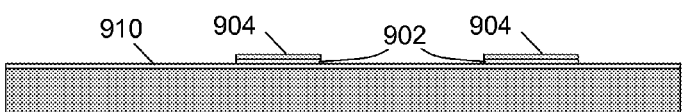
Figure 9F:
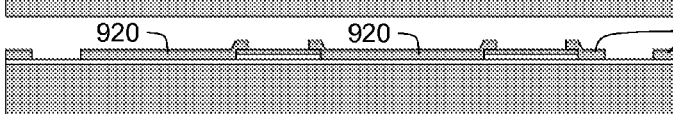
Figure 9G:
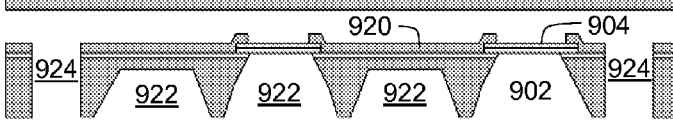
Figure 9H:
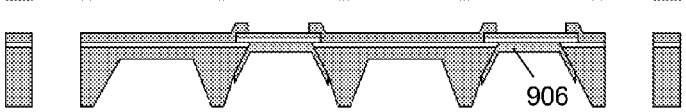

Referring to FIGS. 9A-D another embodiment of an integrated fuel cell stack is shown having an interleaved design. In FIGS. 9A-D, the stack comprises solid oxide electrolyte layers 902, porous cathode layers 904, porous anode layers 906 and various substrates 908 that can comprise an electrical insulator layer 910 (e.g., silicon dioxide on a silicon substrate material) and/or an electrically conductive layer 920. FIGS. 9B-D are various cross sectional views illustrating the interleaving and gas delivery where FIG. 9B is a cross section through an "odd numbered" layer of the stack and FIG. 9C through an "even numbered" layer of the stack, both figures showing channels 912 and holes through multiple layers 916 for gas delivery to the anode layer 906, channels 914 and holes through multiple layers 918 for delivery of gas to the cathode layer 904. FIG. 9D illustrates embodiments of provision of gas to and exhaust from the manifolds.

FIGS. 9E-H schematically illustrate various embodiments of forming a fuel cell core usable, e.g., in providing the structure of FIG. 9A. In various embodiments, a patterned solid oxide electrolyte layer 902 is formed on an electrically insulating surface 910 of a substrate 908, and first patterned porous electrode layer, e.g. a cathode layer, 904 is formed on the electrolyte layer. A patterned electrically conductive layer 920 is formed. Etching is used to form a series of channels 922 and holes 924 in the substrate and expose the back side of the electrolyte layer. The second porous electrode layer, e.g., an anode layer, 906 is then formed on the back side of the electrolyte layer.

In various embodiments, a step of forming a porous electrode and/or solid oxide electrolyte layer comprises one or more of electron beam evaporation, chemical vapor deposition (CVD), plasma enhanced chemical vapor deposition (PVD), electrochemical vapor deposition (EVD), electron beam evaporation, sputtering (e.g., by thermal evaporator, plasma, laser, RF sputtering, reactive sputtering, etc.), and molecular beam epitaxy (MBE). For example, in various embodiments, a step of forming a porous electrode and/or solid oxide electrolyte layer comprises co-sputtering of one or more dopants, one or more ceramic oxides, or a combination thereof. In various embodiments, a step of forming a porous electrode and/or solid oxide electrolyte layer comprises co-evaporation of one or more dopants, one or more ceramic oxides, or a combination thereof. In various embodiments, a material is deposited to form a porous electrode and/or solid oxide electrolyte layer under vacuum conditions of less than about less than about one or more of about $5 \times 10^{-7}$ torr, about $3 \times 10^{-7}$ torr, and/or about $1 \times 10^{-7}$ torr.

It is to be understood that the solid oxide electrolyte layers can have lateral dimensions substantially greater than the nanometer scale, such as for example on the order of microns, 10's of microns, 100's of microns and larger. In various embodiments, for example, directional processes (e.g. sputtering or other vacuum deposition, dry etching) can be performed using shadow masking, photolithography, screen printing, etc., and non-directional processes (e.g., wet etching, atomic layer deposition) can be performed using photolithography or screen printing.

In various embodiments it is believed, without being held to theory, that the formation of a nanoscale film with substantially no amorphous phase between grain boundaries can be facilitated and/or provided by formation of the electrolyte layers with and/or on surfaces that have a surface root-mean-square roughness of less than about 3 nm, preferably less than about 2 nm, and more preferably less than about 1 nm.

In various embodiments, a substrate surface with a root-mean-square surface roughness of less than about one or more of about 3 nm, less than about 2 nm, and/or less than about 1 nm can be provided, e.g., by one or more of chemical mechanical polishing, thermal anneals, ion bombardment (such as, e.g., with Ar ions), and the like. In various embodiments, a porous electrode layer with a root-mean-square surface roughness of less than about one or more of about 3 nm, less than about 2 nm, and/or less than about 1 nm can be provided, e.g., by one or more of chemical mechanical polishing, thermal anneals, ion bombardment (such as, e.g., with Ar ions), and the like. In various embodiments, a solid oxide electrolyte layer with a root-mean-square surface roughness of less than about one or more of about 3 nm, less than about 2 nm, and/or less than about 1 nm can be provided, e.g., by one or more of chemical mechanical polishing, thermal anneals, ion bombardment (such as, e.g., with Ar ions), and the like.

A variety of techniques can be used to determine root-mean-square surface roughness including, but not limited to, scanning tunneling microscopy (STM), atomic force microscopy (AFM), lateral force microscopy (LFM), scanning near-field optical microscopy (SNOM), magnetic force microscopy (MFM), atomic force microscopy (AFM), and Interference microscopy (IM). It is to be understood that at the present time, surface metrology measurements at the nanometer scale are difficult and the errors, typical uncertainty and accuracy of such measurements be considered when evaluating such measurements. Examples of various measurement protocols and further information on nanometer scale metrology can be found, e.g., in the context of the American National Standards Institute (ANSI) ASTM F 1438, ANSI B46. I standards, the American Society of Mechanical Engineers (ASME) ASME B46.1 standards, the International Organization for Standardization (ISO) (L'Organisation Internationale de normalisation) ISO 4287, 4288 standards, and Deutsches Institut fur Normung (DIN) DIN 4762 standards.

In various embodiments, a solid oxide electrolyte layer can be fabricated by forming a first outer solid oxide electrolyte layer less than about 5 nm thick by thin film deposition of a first solid oxide material, followed by formation of first inner solid oxide electrolyte layer by thin film deposition of a second solid oxide on the first outer solid oxide electrolyte layer, followed by forming a second outer solid oxide electrolyte layer less than about 5 nm thick by thin film deposition of a third solid oxide material, where the third solid oxide material can be substantially the same as the first material. In various embodiments, the first and third solid oxide materials consist essentially of solid oxides that are substantially only ionic conductors, and the second solid oxide material is solid oxide that is both an ionic and electronic conductor.

Figure 10E:
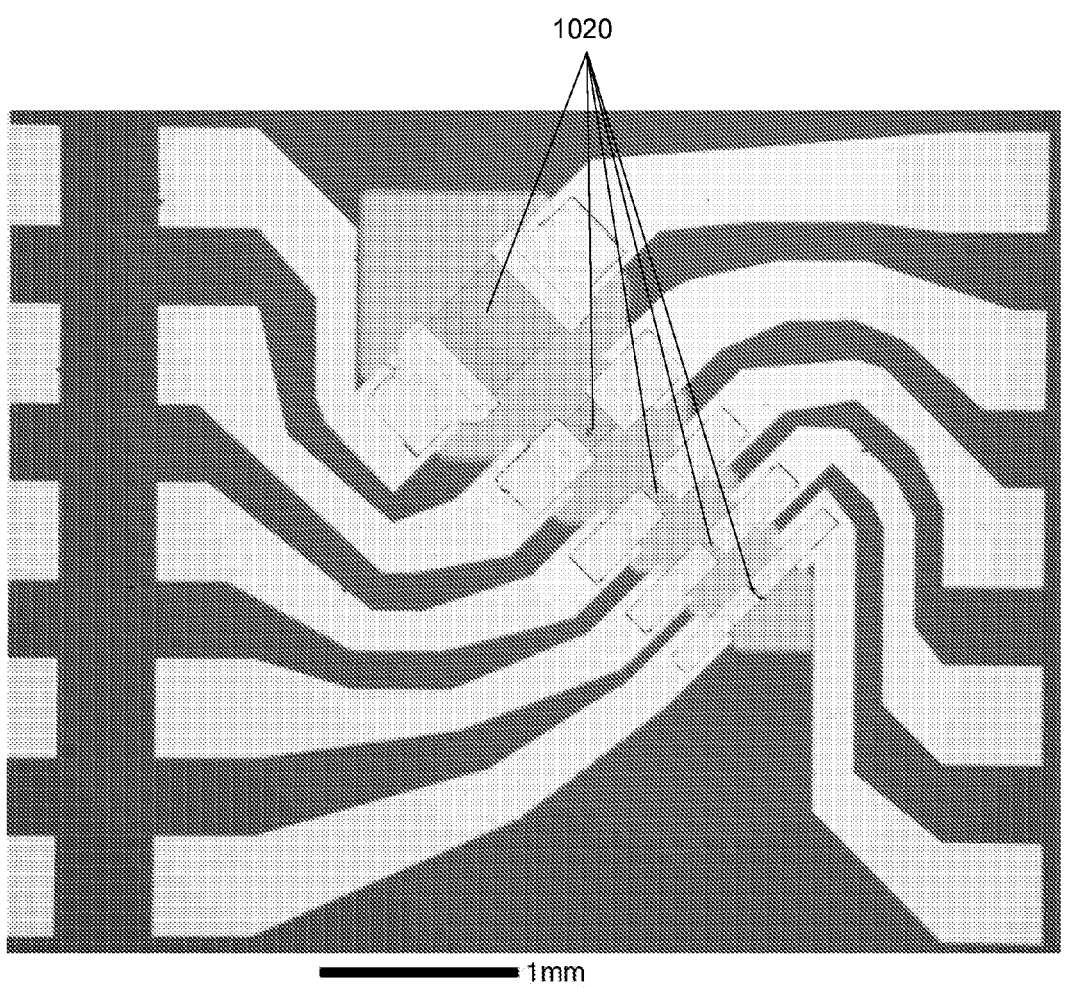

Referring to FIGS. 10A-10E photographs of various electrolyte structures, e.g., FIGS. 10B, 10D and 10E and are shown together with schematical depictions, e.g., FIGS. 10A and 10C to facilitate understanding of the photograph. In FIGS. 10A-10D, a structure is shown fabricated with a silicon substrate 1002 having a silicon nitride ($Si_3N_4$) coating 1004 prior to removal of a portion of a silicon nitride layer 1006 (subtrate removed) for deposition of an electrode layer, for example, on a YSC solid oxide electrolyte layer 1008. Electrode layers are not shown in FIGS. 10A-E so as to not block showing the electrolyte layer. The solid oxide electrolyte layer in FIGS. 10B and 10D is about 200 nm thick. Electrical contacts, e.g., Pt electrodes 1010 and contacts (Ti/Pt) 1012 have also been fabricated to illustrate interconnection.

FIG. 10E is a photograph of a structure with multiple YSZ membranes solid oxide electrolyte layers 1020 with various lateral dimensions in the micron scale range and thickness in the 200 nm or less range. The solid oxide electrolyte layer in FIG. 10E is about 170 nm thick.

EXAMPLES

Example 1

Yttria-Doped Zirconia Solid Oxide Electrolyte Layers

The present example provides experimental data on solid oxide electrolyte layers formed according to various embodiments of the present inventions; demonstrating various properties of these layers and comparing them to more traditional layers. The solid oxide electrolyte layers were formed by deposition on a MgO substrate and tested, and layers formed by deposition on an $Al_2O_3$ substrate and tested. Further details can be found in the published article Applied Physics Letters, 89,183116 (2006).

Materials and Methods

Single crystal MgO (100) (purchased from MTI Corporation) were used as substrates for depositing yttria-doped zirconia films of varying thickness. The film deposition was carried out by electron beam evaporation with the substrate at room temperature at an estimated deposition rate of 0.5 Angstroms/second (A/s). Yttria stabilized zirconia (YSZ) (9.5 mol % yttria) pieces were used as the source material. The MgO substrate was first cleaned in acetone, methanol, and subsequently with de-ionized water and then heat treated to 600° C. in situ in the electron beam chamber for 30 min. Film thicknesses were measured using Rutherford backscattering and low angle x-ray scattering. YDZ films with thicknesses of 17, 35, 70, and 210 nm were formed on a substrate.

A series of films was deposited on a MgO (100) single crystal substrate measuring 10×10 mm². The film area was fixed at 8×8 using a mask. A series of films were also deposited on (0001) $Al_2O_3$ substrates using substantially the same procedure described this example for MgO.

The electrical conductivity measurements were carried out on heat treated films using a high temperature setup comprising of a machined alumina sample holder that was built into a furnace and the electrical leads were made of pure platinum.

Data and Discussion

Figure 11:
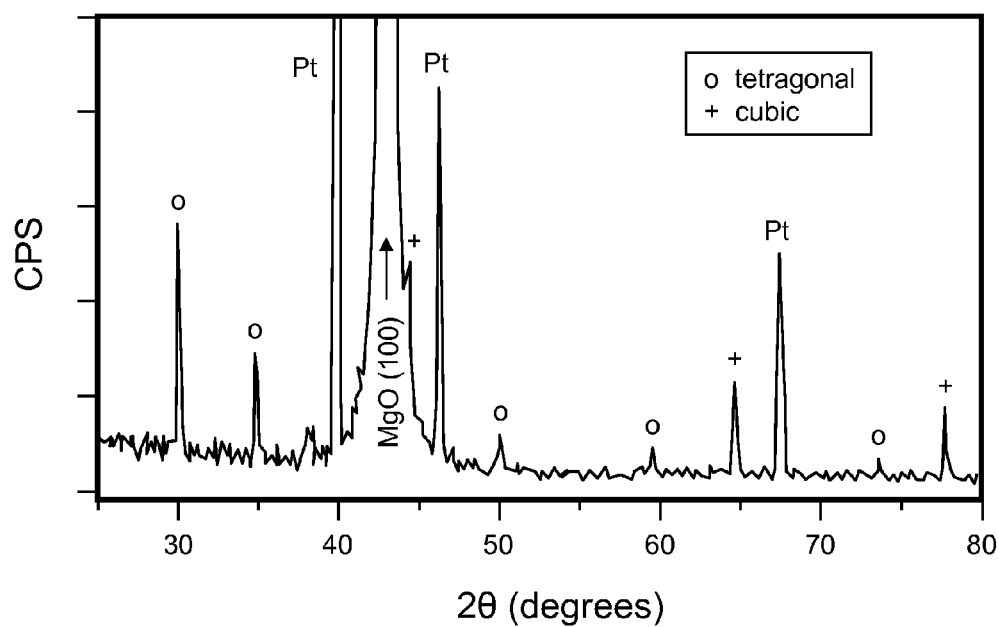
FIG. 11 depicts an x-ray diffractogram of the 9.5% yttria-doped zirconia film with a thickness of 210 nm, recorded after conductivity measurements, of Example 1.

X-ray diffraction data for a 210 nm thick film recorded after electrical conductivity measurements are shown in FIG. 11. Examinations of phases in this 210 nm thick film and films of lower thickness show that the yttria-doped zirconia is partially stabilized. Additional diffraction peaks seen in FIG. 11 are due to the platinum electrodes and MgO substrate as indicated by PT and MgO notations respectively.

Figure 12:
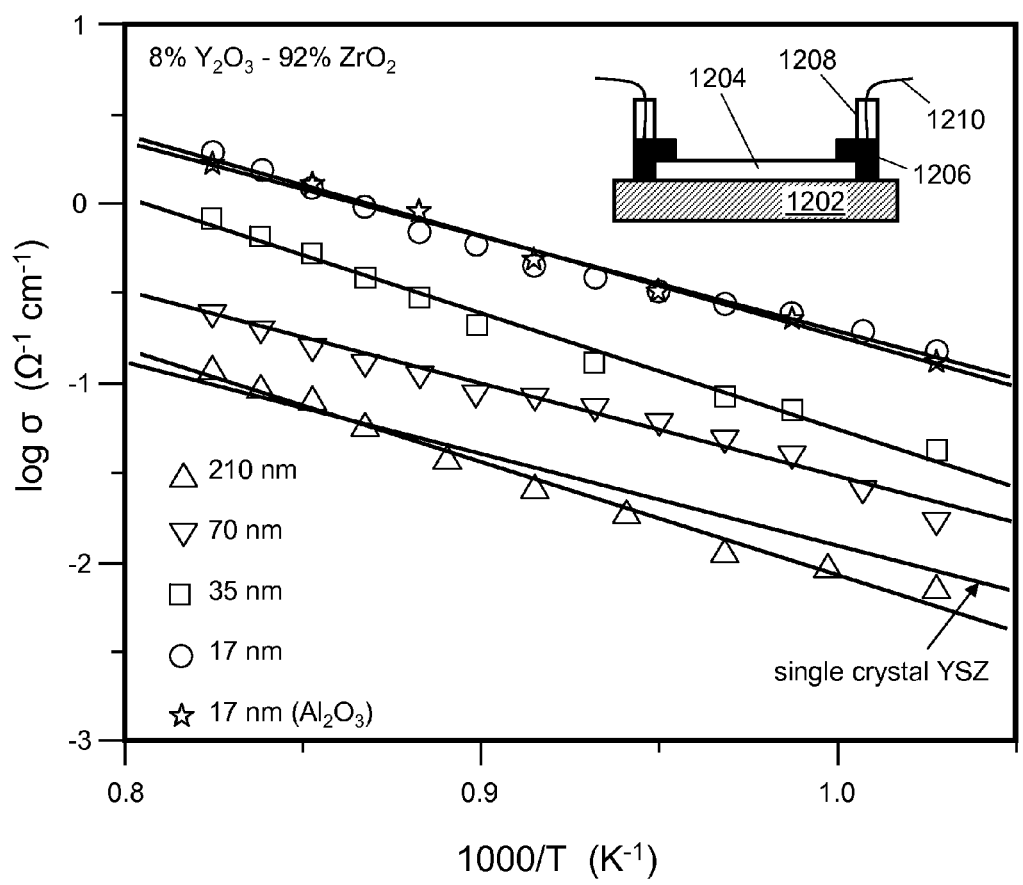
FIG. 12 depicts the temperature dependence of electrically conductivity of 9.5% yttria-doped zirconia nanoscale films of various thicknesses deposited on a MgO substrate and a 17 nm film deposited on an $Al_2O_3$ substrate of Example 1. The inset schematically depicts the experimental set up for the electrical measurements.

An Arrhenius plot of total conductivity for films of various thicknesses grown on MgO is shown in FIG. 12, legend inset in figure. The inset in FIG. 12 is a schematic diagram of the experimental set-up showing the substrate 1202, film 1204, alumina sample holder 1206, electrodes 1208 and platinum leads 1210. The electrical conductivity of single crystal of 10% YSZ is also shown in FIG. 12 for comparison, indicated by notation "single crystal YSZ". High conductivity close to single crystal values is observed even with polycrystalline samples of thickness as low as 210 nm. These values when compared to the bulk polycrystalline values are higher and are attributed to interfacial effects. For the 17 nm thick film, total conductivity enhancement was observed in this example to be nearly one order of magnitude higher than that for single crystal YSZ.

Figure 13:
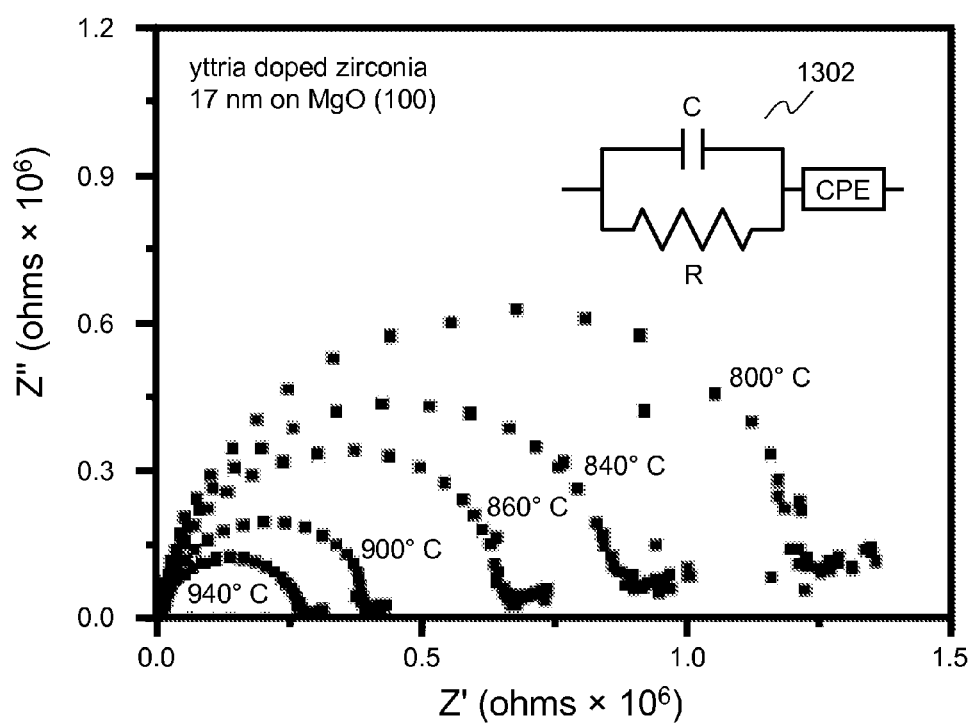
FIG. 13 depicts complex impedance spectra (Nyquist diagram) of 17 nm thick yttria-doped zirconia film deposited on a (001) MgO substrate of Example 1 at various temperatures.

Sample complex impedance spectra (Nyquist diagram) of a 17 nm thick film deposited on MgO and recorded at various temperatures are shown in FIG. 13. An example of the equivalent circuit is shown as an inset 1302 in FIG. 13. One semicircular arc corresponding to ionic conduction in the film is observed at high and intermediate frequencies. At lower frequencies, formation of a small straight line with phase angle is observed and is attributed, without being held to theory, to the partially nonporous nature of the platinum electrode and the associated electrode processes. Similar results were observed for samples of higher thickness up to a thickness of about 210 nm.

The resistance of bare MgO and $Al_2O_3$ substrates was systematically measured under identical conditions and found to be significantly higher than the samples and conductivity values were about five to six orders less than that of YSZ and moreover have higher activation energies (MgO about 1.3 electron volts (eV) and $Al_2O_3$ about 1.67 eV). The activation energy for oxygen ion migration observed in the thin-film samples was found to be nearly 1.1 eV and agrees well with activation energy typically observed in bulk YSZ.

In order to better understand the role played by the MgO/YSZ interface, a 17 nm thick film was also grown on Al$_2$O$_3$ (0001) and identical heat treatments and conductivity measurements as described earlier were carried out. The conductivity result for YDZ films on the alumina substrates is also shown in FIG. 13 (data represented by open stars) and seen to be similar to that of the films grown on MgO substrate.

The conduction relaxation mechanism in the thin films was further investigated by analyzing various immittance parameters as a function of frequency (f) and temperature. From the electrical modulus a frequency domain within which the ionic transport is long range and above which it is localized can be distinguished. Ionic transport processes would represent a peak in the imaginary part of modulus (M") as a function of frequency and no such corresponding peak in the imaginary part of dielectric constant ($\in$"). The yttria-doped zirconia film deposited on MgO and Al$_2$O$_3$ was observed to have no peaks in the $\in$" vs f plots in the temperature range of 700-940° C. However, all the samples show a clear peak in the corresponding M" vs f plots.

Because solid oxide fuel cells, such as the one disclosed herein, operate at elevated temperatures, the fuel cell stack needs to be encapsulated to provide thermal shielding.

For 10 W electrical output, this implies a full cell stack of approximately 2 cm$^3$, which for minimal surface area within the constraints of reasonable assembly, means about a 13-mm cube. At 50-70% conversion efficiency, 10 W produced power will come with 4-10 W dissipated power. This section describes how to encapsulate this stack for thermal shielding and convenient access to the gas lines and electrical contacts at room temperature, the goal being a plug-in module.

There are four components to heat loss from the cell that must be considered: through the insulation, through the support structure, through the electrical contacts, and via the gas (fuel and air) transport. We will discuss each individually with the goal of constraining their sum to the 4-10 W thermal power we are already dissipating. Where a range of powers is indicated in the following sections, the lower end corresponds to 300° C. operation, the upper to 500° C.

Insulation

The insulation has the most stringent requirements, as it must surround the entire surface area of the stack (approx. 10 cm$^2$). The two basic strategies for this insulation are porous material (probably a silica aerogel) or a vacuum, although there are some possible advantages to a hybrid approach.

Aerogels which are "opacified"—infused with a material to strongly absorb and reradiate infrared light—can have thermal conductivities from 300-500° C. to room temperature as low as about 20 mW/m·K, of which roughly 50% is due to radiation, 10% is solid conduction, and 40% is gas conduction. This gives about 4-7 W for 2 mm-thick aerogel, or 2.5-4 W for 4 mm (note that this does not quite follow the relation P=κA·ΔT/t (Power=conductivity×area×temperature difference/thickness), because the effective surface area increases with insulation thickness. An approximate formula is P=κA·ΔT[1/t+2/w] where w is the width of the stack). This dissipation might be sufficiently low already, but by pumping the air out to around 1 mBar the gas contribution can be eliminated lowering the dissipation to about 1.5-2.5 W through 4 mm of aerogel.

If the cavity surrounding the stack is simply evacuated, thermal transport to the walls occurs via radiation and conduction through the remaining gas. Radiation follows P=σ$\in$A(T$_h^4$−T$_c^4$), with σ the Stefan-Boltzmann constant, $\in$ the emissivity of the stack, T$_{h,c}$ the hot and cold temperatures in Kelvin. Emissivity around 0.1 should be achievable by coating the stack first in an electrical insulator (such as glass) and then in a metal (perhaps zinc, as its emissivity does not change much if it oxidizes). The emissivity of the outer wall is less important, as it will have a higher surface area, although it will benefit somewhat from a metal coating. This yields a power of 0.6-2.0 W. In principle, one or more layers of foil (known as superinsulation) may be inserted between the stack and the outer wall to further decrease this dissipation, but for the added complexity this is likely not worthwhile.

Figure 14:
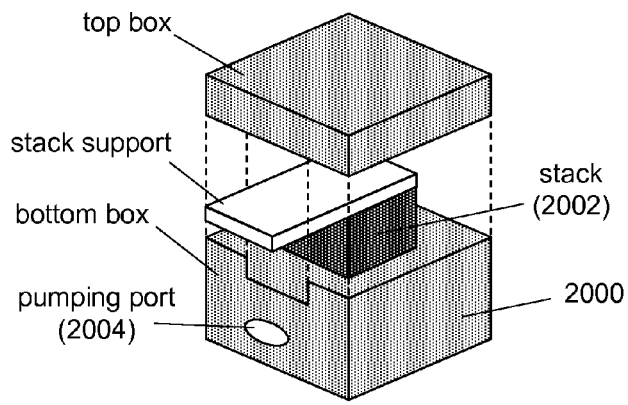
FIG. 14 is a perspective, exploded view of encapsulation structure.

The conductivity of a residual gas does not decrease substantially until the mean free path λ of its constituent molecules is longer than the distance between the hot and cold surfaces, at which point the distance becomes irrelevant. An approximate formula for this is P=κAΔT/(t+λ). Air has conductivity about 25 mW/m·K, giving 3.8-6.3 W dissipation across a 2 mm gap from atmospheric pressure down to 1 mBar, then dropping to 0.8-1.3 W at 0.1 mBar and 110-170 mW at 10$^{-2}$ mBar. Thus, it is clear that we can achieve better insulation with a vacuum than with an aerogel, but sustaining a pressure of 10$^{-2}$ mBar or less around a high-temperature stack may prove impractical without the luxury of a pump. A small absorber in an extension of the chamber, at room temperature, could be used to help maintain this pressure. Also, if a vacuum is used, a strong and leaktight outer casing is required. This can be as simple as a box 2000, fabricated in two pieces and fused to the support structure for the stack 2002 as shown in FIG. 14. One potential disadvantage of this design is the non-planar seal to the lower piece of the glass box; a solution to this, taking advantage of the fact that the eventual support structure will need a more complex shape anyhow, is presented below which also discusses box materials. The box may be pumped through a valve (in order to repump later) or if a permanent seal is acceptible, simply through a protruding glass tube which is heated and pinched after pumping. This pumping port 2004 could be located anywhere on the glass box away from the sealing edges.

Support Structure

Some solid material is required to connect the stack 2002 to the outside, to hold it in place, as well as to carry the gas and electrical connections. The material for this connection should be strong but with minimal thermal conductivity, and in principle it could be a mix of electrical conductors and insulators and function as the electrical contact as well, however as will become clear, electrical conductors need to be very thin and would not be strong enough—a better option is to design an insulating support to minimize its own thermal conduction, then plate thin conductors onto it for the electrical contacts.

Glass has about the lowest thermal conductivity of any dense solid, and choosing the correct glass, we can expect an average from room temperature to 500° C. of at most 1 W/m·K. Assuming a cross-sectional area of 1 mm×1 cm and a thickness (outer wall to stack) of 2 mm, the glass would conduct 1.5-2.5 W. By cutting appropriate holes to reduce the cross section, or choosing a longer path between room temperature and the stack, we should be able to reduce this to below 1 W.

Electrical Leads

The Wiedemann-Franz law relates the electrical and thermal conductivities of a material: κ/σ=LT, where L=π$^2$k$^2$/3e$^2$=2.45×10$^{-8}$ WΩ/K$^2$. It's easy to make a material that does worse (more thermal conductivity) if the conduction electrons are not the primary carriers of heat, but unless the electrons can be put into some nonthermal distribution (as in superconductors, for example) it does not appear possible to do better. Because thermal and electrical conductance scale identically with geometry, this law holds in extensive form as well, using the average temperature: $G_{th}/G_{el}=LT_{mean}$. Given two leads, this yields a relation between thermally conducted and Joule heating power, $P_{th}=4I^2LT_{mean}\Delta T/P_{el}$. As both $P_{th}$ and $P_{el}$ are losses, minimizing their sum gives $P_{el}+_{th}=4I(LT_{mean}\Delta T)^{1/2}$ at a resistance $R=(LT_{mean}\Delta T)^{1/2}/I$ per lead. If our 10 W stack operates at 1 A (corresponding to about 15 cells in series), this gives $P_{el}+_{th}=230-320$ mW with $R=0.05-0.08\Omega$. We may, however, prefer to design the system with somewhat lower Joule heating and higher thermal conductance, since Joule heating is a loss after the electricity is created while the thermal power is already created by the inefficiency in the stack itself. In addition, since this power loss scales with current, it could be reduced by increasing the number of cells in the stack.

Good metals have resistivity in the $10^{-8}$-$10^{-7}$ $\Omega$·m range, and if we choose a length of 10 mm and width 1 mm, this implies a thickness in the range of 1-20 μm. Such a thickness is easy to fabricate, and can be mated to thicker sections on the outside (for robust contacts) and inside (for minimal loss at the stack).

Gas Transport

Fuel and air need to be warmed to the stack temperature for reaction. For each input stream we can calculate a molar flow rate $Q=P/(FVnx)$ where P is the output power, F is Faraday's constant (96500 C/mol), V is the voltage of one cell, n is the number of electrons per mole (4 for $O_2$, 2 for $H_2$, 8 for $CH_4$, etc.) and x is the mole fraction of the active species. $x=0.2$ for $O_2$ in air, 1 for $H_2$. x may be <1 for other fuels if we need to humidify them, for example, to facilitate internal reforming. If the active species is not fully consumed (for example an oversupply of air) this will further decrease x, though this is left out of the following analysis. Also left out is the fact that the input and output streams may contain different molar flow rates. The air stream will contain less $O_2$, although this is likely a small effect as the 80% $N_2$ will be unaffected. More importantly, the fuel stream, if a fuel other than $H_2$ is used, will contain more molecules ($CH_4$, for example, would yield $CO_2+2H_2O$). This means that the exhaust will have higher heat capacity than the supply, and the exhaust can fully heat the supply and still carry away excess heat. The simplest way to look at this is as a result of the changing energetics of the reforming reaction as a function of temperature. In general the reforming reaction will generate some heat in the stack, which is less at higher temperature than it would have been at room temperature. As this discussion is largely independent of which fuel is chosen, I have not attempted to quantify either heat source, but note that both will be small powers that will make our thermal management problems slightly easier.

For a 10 W stack at 60% efficiency, molar flow rates are $1.8\times 10^{-4}$ mol/sec for air, $7\times 10^{-5}$ mol/sec for $H_2$, and less for other fuels. The power required to heat these flows is $P_{gas}=Qc_p\Delta T$, where $c_p$ is the heat capacity at constant pressure, about 30 J/mol·K for most simple gases. This gives 1.6-2.7 W for air, 0.6-1.0 W for $H_2$, and somewhat less for other fuels (n is larger but so is $c_p$ for larger gas molecules).

If the input and output gas streams are routed past each other in a heat exchanger configuration, some of the power to heat the input stream can be obtained by cooling the exhaust. If the heat exchanger is modeled as two counterpropagating streams of height h separated by a barrier of thickness t, with a length l and width w, $P_{gas}$ will decrease by roughly the factor $1+lw/[Qc_p(t/\kappa_B+h/\kappa G)]$. $\kappa_B$ and $\kappa_G$ are the thermal conductivities of the barrier and gas, although efforts to mix the gas may dramatically reduce the effective $h/\kappa_G$. Ignoring this term (i.e. perfect mixing), a pair of 2 mm×5 mm channels separated by 0.1 mm-thick glass ($\kappa_B=1$ W/m·K) would exchange 95% of the heat in the air flow. With no mixing, though, air only has $\kappa_G\sim 40$ mW/m·K, so if the channels are 0.2 mm tall, the same device would only remove 25% of the heat. If substantial mixing is not possible, more complicated support structures may be needed, which wind their way from the stack to room temperature to allow for a bigger heat exchanger. Note that the lower Q for the fuel side, in addition to decreasing the heating power, makes heat exchanging more efficient.

Table 1 collects the key numbers from the four categories of heat loss described above, sums them for four different scenarios (300° C. or 500° C., and vacuum or aerogel insulation) and calculates, given 10 W output, the maximum operating efficiency of the stack that would maintain this heat flow, either as stated or with a projected 50% reduction in heat loss due to the improvements recommended in the notes column.

TABLE 1 key heat losses

|  | Watts at 300° C. | Watts at 500° C. | Notes |
|---|---|---|---|
| Insulation | 0.6/2.5 | 2.0/4.0 | Vacuum/Aerogel Lower: vacuum with superinsulation |
| Support | 1.5 | 2.5 | Lower with a longer path |
| Electrical | 0.2 | 0.3 | Slightly higher to reduce ohmic loss |
| Gas | 2.2 | 3.7 | Lower with heat exchangers |
| Total | 4.5/6.4 Efficiency at 300° C. | 8.5/10.5 Efficiency at 500° C. |  |
| Max Efficiency | 69/61% | 54/48% | assuming total heat loss as calculated |
| Max at Low Loss | 82/76% | 70/66% | assuming 50% lower heat loss |

If our target is 60% efficiency, even at 500° C. we can achieve this goal with only a little extra effort. Note that both heat loss and current/voltage/temperature characteristics will stabilize the system: if the stack is operating too efficiently (i.e. not producing enough extra heat to balance dissipation) it will cool, thereby decreasing the heat transport at the same time as it increases heat generation due to increased electrolyte and electrode overpotentials, until the heat generated balances the heat dissipated. Likewise, if the stack is operating too inefficiently it will heat up, increasing heat transport and decreasing heat generation. This feedback requires that we draw constant electrical power, however. If we have improved the insulation to the extent that this feedback produces an undesirably high stack temperature, we can always increase the heat loss by supplying excess air.

Integrated Stack Encapsulation Design

Following is a more detailed encapsulation design that brings these ideas together—allowing simple sealing of the stack inside an insulated shell, with an interconnect structure integrating support, gas handling, and electrical leads. This interconnect structure will be made in three layers. Two glass layers have gas channels cut or etched into them, and holes are cut through them to reduce thermal contact from the stack to room temperature. These glass layers sandwich a thin heat transfer layer, which may also be glass or may be a thin metal foil. These three layers are fused together, have the electrical leads applied to them, get bonded to the fuel cell stack, and finally this whole structure gets bonded into the encapsulating shell.

Figure 15A:
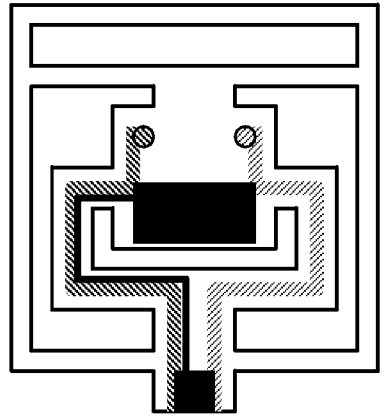
FIGS. 15 A-D are schematic illustrations of an embodiment of the interconnect support structure.
Figure 15B:
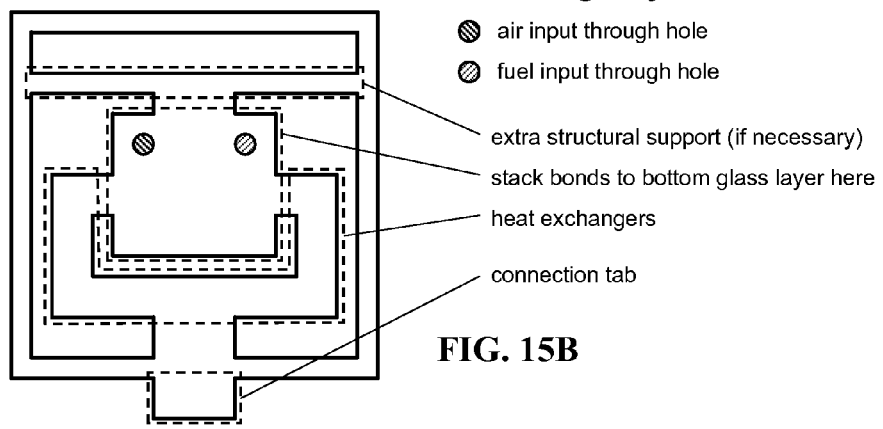
Figure 15C:
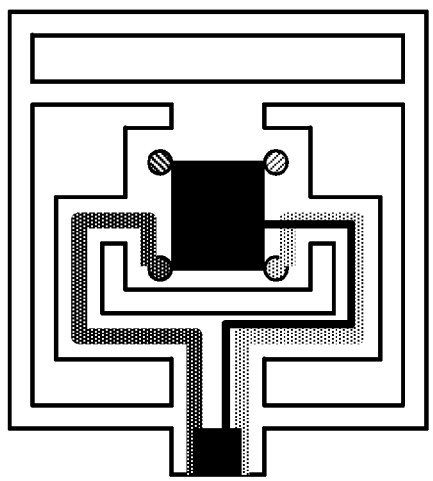
Figure 15D:
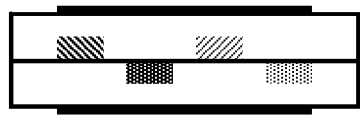

FIG. 15A-D shows schematically what the three layers look like. FIG. 15A shows the top glass layer; FIG. 15B shows the heat exchange layer and FIG. 15C shows the bottom glass layer. FIG. 15D is a side view of the connection tab with electrodes top and bottom and fuel and air openings on an end. Each layer has the same rough shape, with slightly different channels or gas flow holes cut into it. The central square region 2006 covers the top of the fuel cell stack, with the bottom layer being bonded directly to the stack. The outer rim will be incorporated into the outer shell, and this is connected to the central square via two heat exchanger arms—one for air, one for fuel. These heat exchangers take an indirect path between high and low temperature in order to minimize heat conduction in the glass they are made of while maximizing heat transfer between the counter-propagating gas streams. In the simplest configuration, the two come together as they exit to room temperature, so that all of the gas and electrical connections for the stack emerge on a single tab (the Connection Tab) to facilitate easy installation and replacement of the encapsulated stack. In addition to the heat exchangers, greater strength can be achieved, if necessary, by leaving another indirect connection between the stack and the outer rim.

Figure 16A:
FIGS. 16 A-E are schematic diagrams illustrating assembly of an embodiment of the encapsulating structure according to the invention.
Figure 16B:
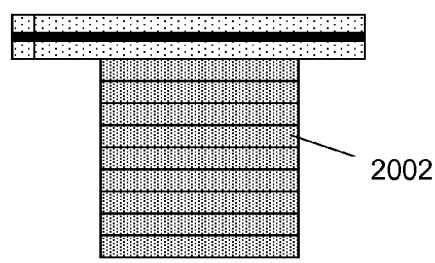
Figure 16C:
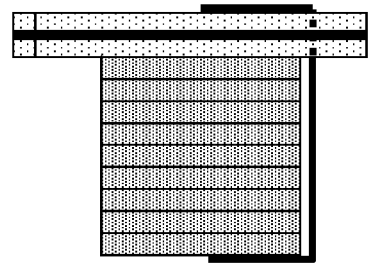
Figure 16D:
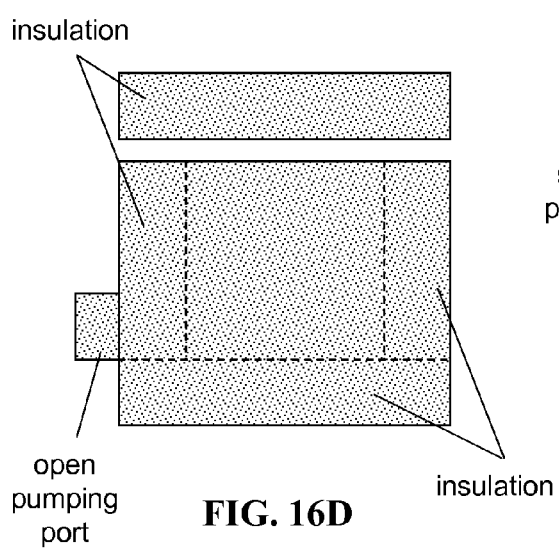
Figure 16E:
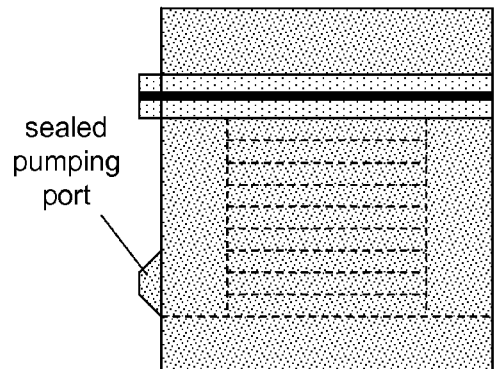

With the interconnect structure as shown in FIG. 15, both the top and bottom pieces of the outer case can be made with flat bonding surfaces. These pieces may be made of glass as well; conceptually, this is the simplest option, because these pieces may be fused directly to the interconnect structure. However, as the case will never be at high temperature, almost any material may be used and glued to the interconnect structure, although it must be vacuum compatible if the insulation is evacuated. The assembly process is shown in FIG. 16. In FIG. 16A, three interconnect structure layers are fused together. As shown in FIG. 16B, the interconnect structure is fused onto the stack 2002. Thereafter, as shown in FIG. 16C, one electrically insulates the side of the stack and connects the bottom of the stack to the top of the interconnect structure (with metal paint, perhaps). As shown in FIG. 16D, the outer casing is prepared and aerogel insulation, if chosen, is inserted. As shown in FIG. 16E, the interconnect structure and stack are fused into the outer casing (and pump and seal if vacuum is chosen).

Using the interconnect structure in FIG. 15, heat loss due to the support structure and gas transport are both reduced relative to the values given in Table 1. As shown, the glass support structure (about 15 mm long with a cross section of 2 mm$^2$) would conduct roughly 40-70 mW, and the heat exchanger would remove at least 50% of the heat load in the air, leaving at most 1.1-1.8 W of heat load. Total heat loads would then be 2.0-4.2 W with vacuum insulation, 3.9-6.2 W with aerogel. This design is then slightly better than the "Low Loss" case from Table 1. Even at 500° C. with aerogel insulation we can sustain 62% efficiency.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way.

While the present inventions have been described in conjunction with various embodiments and examples, it is not intended that the present inventions be limited to such embodiments or examples. On the contrary, the present inventions encompass various alternatives, modifications, and equivalents, as will be appreciated by those of skill in the art. Accordingly, the descriptions, methods and diagrams of should not be read as limited to the described order of elements unless stated to that effect.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

What is claimed is:

1. A solid oxide fuel cell comprising:
   an anode layer that is porous with respect to a fuel gas;
   a layer of solid oxide electrolyte less than about 100 nm thick deposited on a surface of the anode layer at vacuum conditions of less than about 5×10-7 torr, so that an ionic conductivity of the layer of solid oxide electrolyte is greater than about 0.00001 ohm-1 cm$^{-1}$ at a temperature of less than about 500° C.; and
   a cathode layer that is porous with respect to an oxidizer, the cathode layer deposited on at least a portion of the layer of solid oxide electrolyte;
   wherein at least a portion of the surface of the anode layer has a root-mean-square roughness of less than about 3 nm;
   wherein the layer of solid oxide electrolyte has a root-mean-square roughness of less than about 3 nm,
   and wherein the layer of solid oxide electrolyte has substantially no amorphous phase between one or more grain boundaries therein, so that an operating temperature of the solid oxide fuel cell is less than about 500° C. while a power density provided by the solid oxide fuel cell at said temperature is greater than about 0.1 W/cm$^2$.

2. An apparatus comprising a stack of solid oxide fuel cells, the solid oxide fuel cells each comprising a first electrode layer that is porous with respect to a fuel gas, a second electrode layer that is porous with respect to an oxidizer, and a layer of solid oxide electrolyte, the layer less than about 100 nm thick, disposed between the anode and cathode layers,
   wherein the layer of solid oxide electrolyte has a root-mean-square roughness of less than about 3 nm and an ionic conductivity greater than about 0.00001 ohm-1 cm-1 at a temperature of less than about 500° C.,
   and wherein the layer of solid oxide electrolyte has substantially no amorphous phase between one or more grain boundaries therein, so that an operating temperature of the solid oxide fuel cells is less than about 500° C. and a power density provided by the solid oxide fuel cells at said operating temperature is greater than about 0.1 W/cm$^2$;
   wherein at least a portion of the surface of the anode layer has a root-mean-square roughness of less than about 3 nm;

a first manifold positioned in fluid communication with the anode layers and configured to convey a fuel to the anode; and a second manifold positioned in fluid communication with the cathode layer and configured to convey an oxidizer to the cathode.

3. The solid oxide fuel cell of claim 1, wherein the solid oxide fuel cell has an operating temperature of less than about 400° C. and wherein a power density provided by the solid oxide fuel cell at said operating temperature is greater than about 0.6 W/cm$^2$.

4. The solid oxide fuel cell of claim 1, wherein the solid oxide fuel cell has an operating temperature of less than about 400° C. and wherein a power density provided by the solid oxide fuel cell at said operating temperature is greater than about 0.6 W/cm$^2$.

5. The solid oxide fuel cell of claim 1, wherein the solid oxide fuel cell has an operating temperature of less than about 500° C. and wherein a power density provided by the solid oxide fuel cell at said operating temperature is greater than about 1 W/cm$^2$.

6. The solid oxide fuel cell of claim 1, wherein the solid oxide fuel cell has an operating temperature of less than about 400° C. and wherein a power density provided by the solid oxide fuel cell at said operating temperature is greater than about 1 W/cm$^2$.

7. The solid oxide fuel cell of claim 1, wherein the anode layer is less than about 10 microns thick.

8. The solid oxide fuel cell of claim 1, wherein the anode layer comprises one or more of Ni, zirconia, Y-doped zirconia, Cu, ceria, Gd-doped ceria, and alio-valently doped oxide ceramics.

9. The solid oxide fuel cell of claim 1, wherein the porous cathode layer is less than about 10 microns thick.

10. The solid oxide fuel cell of claim 1, wherein the porous cathode layer comprises one or more metals.

11. The solid oxide fuel cell of claim 1, wherein the porous cathode layer comprises one or more of Pt, Au, Ta, Ru, Ir, Cu, La, Sr, Fe, LaMnO$_3$, SrMnO$_3$, La$_{1-x}$Sr$_x$MnO$_3$, and La$_{1-x}$Sr$_x$Co$_{1-y}$Fe$_y$O$_3$.

12. The solid oxide fuel cell of claim 1, wherein the porous cathode layer material has a perovskite structure.

13. The solid oxide fuel cell of claim 1, wherein the solid oxide electrolyte comprises a polycrystalline ceramic comprising one or more of stabilized zirconia, partially stabilized zirconia, stabilized hafnia, partially stabilized hafnia, mixtures of zirconia and hafnia, ceria with zirconia, bismuth with zirconia, gadolinium, germanium, and mixtures thereof.

14. The solid oxide fuel cell of claim 1, wherein the solid oxide electrolyte comprises a polycrystalline ceramic comprising one or more of a doped partially stabilized zirconia, a doped stabilized zirconia, and mixtures thereof, wherein the dopant comprises one or more of the oxides of Y, Ce, Ca, Mg, Sc, Nd, Sm, Eu, Gd, Th, Dy, Ho, Er, Tm, Yb, Lu, In, Ti, Sn, Nb, Ta, Mo, and W and mixtures thereof.

15. The solid oxide fuel cell of claim 1, wherein the solid oxide electrolyte comprises a polycrystalline ceramic comprising one or more of yttria-doped bismuth oxide (YDB), gadolinia-doped ceria (GDC), and yttria-stabilized zirconia (YSZ).

16. The solid oxide fuel cell of claim 1, wherein the solid oxide electrolyte layer is less than about 50 nm thick.

17. The solid oxide fuel cell of claim 1, wherein the solid oxide electrolyte layer is less than about 25 nm thick.

18. The solid oxide fuel cell of claim 1, wherein the solid oxide electrolyte layer is less than about 10 nm thick.

19. The solid oxide fuel cell of claim 1, wherein the solid oxide electrolyte layer is less than about 5 nm thick.

20. The solid oxide fuel cell of claim 1, wherein the solid oxide electrolyte layer comprises a first inner solid oxide electrolyte layer disposed between a first outer solid oxide electrolyte layer less than about 5 nm thick and a second outer solid oxide electrolyte layer less than about 5 nm thick.

21. The solid oxide fuel cell of claim 20, wherein one or more of the first outer solid oxide electrolyte layer and the second outer solid oxide electrolyte layer less than about 2 nm thick.

22. The solid oxide fuel cell of claim 20, wherein one or more of the first outer solid oxide electrolyte layer and the second outer solid oxide electrolyte layer have a thickness in the range between about 0.5 nm to about 5 nm.

23. The solid oxide fuel cell of claim 20, wherein the first outer solid oxide electrolyte layer and the second outer solid oxide electrolyte layer consist essentially of one or more materials that are substantially only ionic conductors; and the first inner solid oxide electrolyte layer comprises a material that is an electronic conductor and an ionic conductor.

24. The apparatus of claim 2, wherein at least one of the first and second manifolds have at least one wall comprising silicon.

25. The apparatus of claim 2, wherein at least one of the first and second manifolds comprises a flow passage having at least one dimension less than about 100 microns.

26. A solid oxide fuel cell comprising:
a solid oxide electrolyte material comprising a polycrystalline ceramic formed into a layer less than about 100 nm thick, the layer having an ionic conductivity of greater than about 0.00001 ohm$^{-1}$ cm$^{-1}$ at a temperature of less than about 500° C.;
wherein the layer of solid oxide electrolyte has a root-mean-square roughness of less than about 3 nm, and wherein the layer of solid oxide electrolyte has substantially no amorphous phase between one or more grain boundaries therein.

27. The solid oxide fuel cell of claim 26, wherein the polycrystalline ceramic layer has an ionic conductivity of greater than about 0.0001 ohm$^{-1}$ cm$^{-1}$ at a temperature of less than about 500° C.

28. The solid oxide fuel cell of claim 26, wherein the polycrystalline ceramic comprises one or more of stabilized zirconia, partially stabilized zirconia, stabilized hafnia, partially stabilized hafnia, mixtures of zirconia and hafnia, ceria with zirconia, bismuth with zirconia, gadolinium, germanium, and mixtures thereof.

29. The solid oxide fuel cell of claim 26, wherein the polycrystalline ceramic comprises one or more of one or more of a doped partially stabilized zirconia, a doped stabilized zirconia, and mixtures thereof, wherein the dopant comprises one or more of the oxides of Y, Ce, Ca, Mg, Sc, Nd, Sm, Eu, Gd, Th, Dy, Ho, Er, Tm, Yb, Lu, In, Ti, Sn, Nb, Ta, Mo, and W and mixtures thereof.

30. The solid oxide fuel cell of claim 26, wherein the polycrystalline ceramic comprises one or more of one or more of yttria-doped bismuth oxide (YDB), gadolinia-doped ceria (GDC), and yttria-stabilized zirconia (YSZ).

31. The solid oxide fuel cell of claim 26, wherein the polycrystalline ceramic layer is less than about 50 nm thick.

32. The solid oxide fuel cell of claim 26, wherein the polycrystalline ceramic layer is less than about 25 nm thick.

33. The solid oxide fuel cell of claim 26, wherein the polycrystalline ceramic layer is less than about 10 nm thick.

34. The solid oxide fuel cell of claim 26, wherein the polycrystalline ceramic layer is less than about 5 nm thick.

35. The solid oxide fuel cell of claim 26, wherein the polycrystalline ceramic layer comprises a first inner solid oxide electrolyte layer disposed between a first outer solid oxide electrolyte layer less than about 5 nm thick and a second outer solid oxide electrolyte layer less than about 5 nm thick.

36. The solid oxide fuel cell of claim 35, wherein one or more of the first outer solid oxide electrolyte layer and the second outer solid oxide electrolyte layer less than about 2 nm thick.

37. The solid oxide fuel cell of claim 35, wherein one or more of the first outer solid oxide electrolyte layer and the second outer solid oxide electrolyte layer have a thickness in the range between about 0.5 nm to about 5 nm.

38. The solid oxide fuel cell of claim 35, wherein:
the first outer solid oxide electrolyte layer and the second outer solid oxide electrolyte layer consist essentially of one or more materials that are substantially only ionic conductors; and
the first inner solid oxide electrolyte layer comprises a material that is an electronic conductor and an ionic conductor.

39. The solid oxide fuel cell of claim 26, wherein the polycrystalline ceramic layer has a first surface and a second surface opposed to the first surface; and the root-mean-square roughness of at least one of the first surface and second surfaces is less than about 3 nm.

40. The solid oxide fuel cell of claim 26, wherein the polycrystalline ceramic layer has a first surface and a second surface opposed to the first surface; and the root-mean-square roughness of at least one of the first surface and second surface is less than about 1 nm.

* * * * *